(12) United States Patent
Hoshi et al.

(10) Patent No.: US 7,768,593 B2
(45) Date of Patent: Aug. 3, 2010

(54) SURFACE EMISSION DEVICE, OPTICAL ELEMENT AND LIQUID CRYSTAL DISPLAY DEVICE

(75) Inventors: Mitsunari Hoshi, Miyagi (JP);
Shigehiro Yamakita, Miyagi (JP);
Shogo Shinkai, Miyagi (JP)

(73) Assignee: Sony Corporation, Tokyo (JP)

( * ) Notice: Subject to any disclaimer, the term of this patent is extended or adjusted under 35 U.S.C. 154(b) by 221 days.

(21) Appl. No.: 12/088,563

(22) PCT Filed: Jul. 25, 2007

(86) PCT No.: PCT/JP2007/064588
§ 371 (c)(1),
(2), (4) Date: Mar. 28, 2008

(87) PCT Pub. No.: WO2008/013203
PCT Pub. Date: Jan. 31, 2008

(65) Prior Publication Data
US 2010/0033651 A1 Feb. 11, 2010

(30) Foreign Application Priority Data
Jul. 28, 2006 (JP) ............ P2006-206008
Jun. 28, 2007 (JP) ............ P2007-171078

(51) Int. Cl.
*G02F 1/1335* (2006.01)
(52) U.S. Cl. .................. 349/64; 349/62
(58) Field of Classification Search .......... 349/61–65; 359/599
See application file for complete search history.

(56) References Cited

U.S. PATENT DOCUMENTS

| 2003/0184993 A1* | 10/2003 | Yamada ............ 362/31 |
| 2004/0090572 A1 | 5/2004 | Han et al. |
| 2005/0243551 A1 | 11/2005 | Onishi et al. |
| 2009/0225538 A1* | 9/2009 | Horikoshi et al. ...... 362/225 |

FOREIGN PATENT DOCUMENTS

| JP | 5-333333 | 12/1993 |
| JP | 6-250178 | 9/1994 |

(Continued)

*Primary Examiner*—Dung T. Nguyen
(74) *Attorney, Agent, or Firm*—K&L Gates LLP

(57) ABSTRACT

Using a distance L between the centers of light sources 12, 12; a refractive index n of an optical element 15; a thickness d of the optical element; a distance W from the center of the light source to the optical element; a refractive index $n_0$ of air; an angle of incidence $\theta_1$ of light emitted from the light sources and coming into the optical element, relative to the direction of optical axes; an angle of refraction $\theta_2$ of light, incident on the optical element, in the optical element; a diameter of each light source as D; and a maximum tangential angle a formed between a tangential line in contact with an outer surface of a luminance distribution generating layer 18 and a plane orthogonal to the optical axes, there is included a maximum tangential angle a satisfying $x>L/2-D/2$ when calculating a travel range x of a split image of the light sources in a direction normal to the optical axes using (1) $n_0 \sin(a) = n \sin(a-\theta_2)$, (2) $n_0 \sin \theta_1 = n \sin \theta_2$ and (3) $x = W \tan \theta_1 + d \tan \theta_2$. This facilitates uniformalizing of front luminance distribution.

20 Claims, 29 Drawing Sheets

FOREIGN PATENT DOCUMENTS

| | | |
|---|---|---|
| JP | 10-283818 | 10/1998 |
| JP | 11-142622 | 5/1999 |
| JP | 2001-272509 | 10/2001 |
| JP | 2004-6256 | 1/2004 |
| JP | 2004-127680 | 4/2004 |
| JP | 2004-163945 | 6/2004 |
| JP | 2004-354533 | 12/2004 |
| JP | 2006-084813 | 3/2006 |
| JP | 2006-140124 | 6/2006 |
| JP | 2006-162887 | 6/2006 |

* cited by examiner

— DESIGNED DISTANCE
—·— DESIGNED DISTANCE -8%
----- DESIGNED DISTANCE +8%

FIG. 35
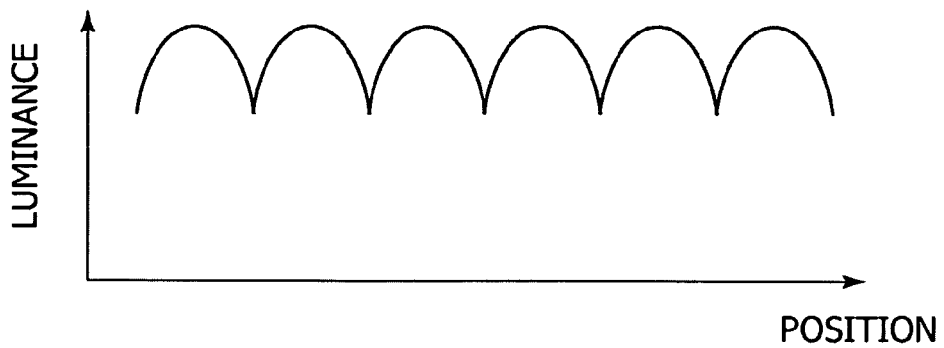
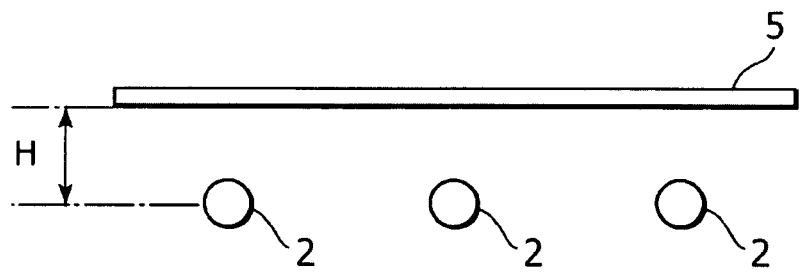
FIG. 36
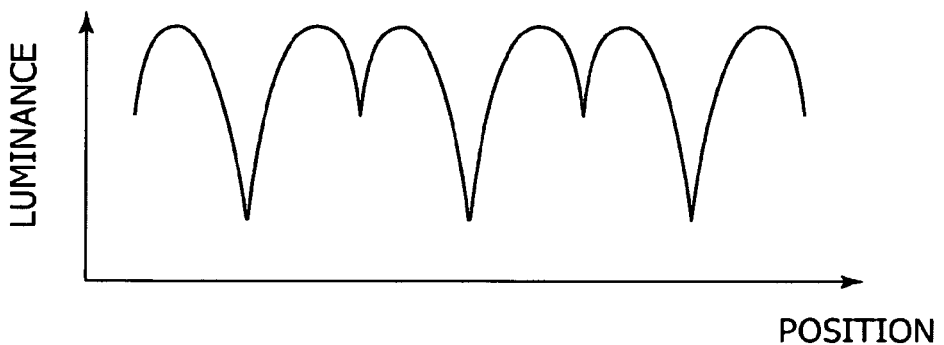
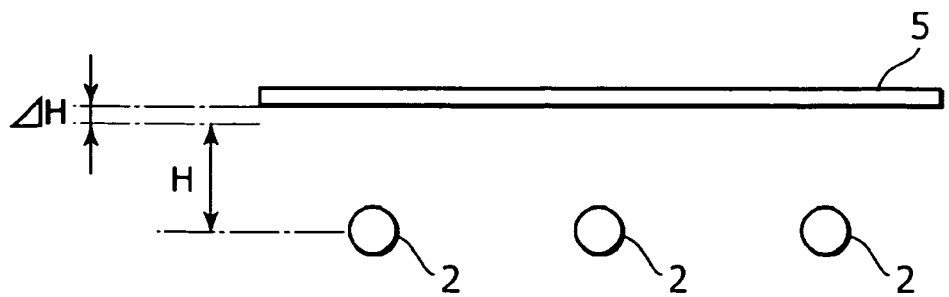

SURFACE EMISSION DEVICE, OPTICAL ELEMENT AND LIQUID CRYSTAL DISPLAY DEVICE

CROSS REFERENCE TO RELATED APPLICATIONS

The present application claims priority to Japanese Patent Document Nos. P2006-206008 filed on Jul. 28, 2006, and P2007-171078 filed on Jun. 28, 2007 the disclosures of which are herein incorporated by reference.

BACKGROUND

1. Technical Field

The present invention relates to technical fields of surface emission device, optical element and liquid crystal display device. For more detail, the present invention relates to technical fields of suppressing non-uniformity in luminance by allowing split images of light sources to overlap between the light sources.

2. Background Art

Liquid crystal display devices provided with backlight (surface emission device) have conventionally been used as display devices for word processors, laptop personal computers and so forth. As the surface emission device for this type of liquid crystal display devices, an edge-light-type backlight, having linear light sources just like fluorescent lamps disposed laterally on a transparent plate (light guide plate), in response to demands for weight reduction and thinning, has been in the main stream.

The edge-light-type backlight has, however, often resulted in insufficient luminance with recent expansion in size of the liquid crystal display device represented by those used for television sets, so that a direct-type backlight, having linear light sources arranged straightly under the liquid crystal display panel has more widely been adopted.

FIG. 32 is a perspective view showing a schematic configuration of a conventional direct-type backlight unit 1. The backlight unit 1 has light sources (linear light sources) 2, 2, . . . such as fluorescent lamps, a reflective plate 3, and a diffuser plate 4.

As the light sources (linear light sources) 2, 2, . . . , cold cathode fluorescent lamps (CCFL) or the like are used, which are formed into columns extended in a predetermined direction.

The reflective plate 3 is disposed so as to make use, in a recycled manner, of light reflected on the diffuser plate 4, etc., or light emitted from the light sources 2, 2, . . . , but not reached the diffuser plate 4.

The diffuser plate 4 is an optical element of at least 1 mm thick or more improved in diffusing and scattering performances, by virtue of having a transparent base and a resin component different from the transparent base in the refractive index randomly contained therein, and is used as an optical element for suppressing variation in front luminance distribution.

In the backlight unit 1, the reflective plate 3 and the diffuser plate 4 are disposed respectively on both sides of the light sources 2, 2, . . . .

In thus-configured backlight unit 1, light emitted from the light sources 2, 2, . . . is extracted from the diffuser plate 4, wherein luminance of illumination flux of the backlight unit 1 may be high straightly above the light sources 2, 2, . . . and may be low between the light sources 2, 2, . . . as shown in FIG. 33, when the distance between the light sources 2, 2, . . . and the diffuser plate 4 becomes small, or the distance between the individual light sources 2, 2, . . . becomes large, and this may degrade uniformity in the front luminance distribution and may cause variation in luminance.

In order to suppress such variation in luminance, as shown in FIG. 34, there has been known a technique of disposing an optical sheet (optical element) 5 such as prism sheet or lenticular lens sheet between the light sources 2, 2, . . . and the diffuser plate 4, or disposing an optical sheet (optical element) 5 such as prism sheet or lenticular lens sheet in place of the diffuser plate 4 (see Japanese Patent Application Publication (KOKAI) Nos. H5-333333, H6-250178, H10-283818, and 2004-6256). FIG. 34 shows an exemplary case where the optical element (prism sheet) 5 is disposed in place of the diffuser plate 4 shown in FIG. 33.

The optical element (prism sheet) 5 has, on the front surface or the back surface thereof, a plurality of linear projections (prisms) consecutively provided at regular pitches, typically having a triangle profile, and is an optical element generally adopted as a sheet for improving luminance. These linear projections function as a luminance distribution generating layer 5a which suppresses variation in luminance in the direction of optical axes of light emitted from the light sources 2, 2, . . . .

The optical element 5 is disposed so that the direction of ridge of the linear projections which function as a luminance distribution generating layer 5a agrees with the longitudinal direction of the light sources 2, 2, . . . . By using the optical element 5, as shown in FIG. 34, extracted illumination flux is split into a plurality of fluxes to give split images 2A, 2A, . . . of each light source, and thereby the variation in the front luminance distribution may be suppressed. FIG. 34 shows an exemplary case where the number of split images 2A, 2A, . . . of each light source was doubled from the number of the light sources 2, 2, . . . by the optical element 5.

The above-described conventional surface emission device 1 has, however, been suffering from a problem in that a large non-uniformity in luminance is likely to occur, when the distance between the light sources 2, 2, . . . and the optical element 5 varies. Variation in the distance may be ascribable to accuracy in processing or assembling of the individual components, or to deformation of the optical element due to environmental changes such as changes in temperature.

For example, as shown in FIG. 35, in a surface emission device designed to ensure uniform front luminance distribution with respect to each of the split images 2A, 2A, . . . of the light sources 2, 2, . . . , when the distance between the centers of the light sources 2, 2, . . . and the optical element 5 is given as H, a change in the designed distance H of the optical element 5 to as much as $\Delta H$ may be highly causative of non-uniformity in luminance as shown in FIG. 36.

The surface emission device 1 is designed so as avoid overlapping of one split image 2A of the light source 2 with the adjacent split image 2A of the light source 2, so far as the designed distance H is maintained, so that such non-uniformity in luminance may occur as a result of a sharp change in the front luminance distribution when the distance H varies. More specifically, a change in the distance H to as much as $\Delta H$ may cause overlapping of the split images 2A, 2A, . . . of the individual light sources 2, 2, . . . , and may raise a sharp change in the front luminance distribution, making non-uniformity in luminance more likely to occur.

The distance between the light sources 2, 2, . . . and the optical element 5 is therefore designed so that a uniform front luminance distribution, as shown in FIG. 35, may be obtainable, but only with a small degree of freedom in the design.

On the other hand, with recent trends in expansion in size of the liquid crystal display devices, also the surface emission devices (backlight unit) have been expanded in size. As a consequence, also the optical elements such as prism sheet, lenticular sheet and so forth are to be expanded in size, for the purpose of making the front luminance distribution uniform.

SUMMARY

Expansion in size of these optical elements, however, makes them more likely to cause sagging or warping due to their self weight, and makes it difficult to stably and uniformly maintain the distance between the optical element and the light sources over the entire surface of the optical element. As a consequence, variation in the distance may be caused between the optical element and the light sources as shown in FIG. 36, the front luminance distribution may be prevented from being made uniform, and non-uniformity in luminance may be more likely to occur.

It is therefore a subject of a surface emission device, an optical element and a liquid crystal display device of the present invention to overcome the above-described problems, and to suppress non-uniformity in luminance by ensuring uniformity in the front luminance distribution, even when the distance between the light sources and the optical element should vary.

Aiming at solving the above-described problems, a surface emission device, an optical element and a liquid crystal display device of the present invention is configured as containing a maximum tangential angle a which satisfies x>L/2−D/2, when travel range x of a split image of the light sources in the direction orthogonally crossing the optical axes is calculated using (1) $n_0 \sin(a)=n \sin(a-\theta_2)$, (2) $n_0 \sin \theta_1=n \sin \theta_2$, and (3) $x=W \tan \theta_1+d \tan \theta_2$, assuming distance between the centers of every adjacent light sources as L; refractive index of the optical element as n; thickness of the optical element as d; distance from the center of the light sources to the optical element in the direction of optical axes as W; refractive index of air in the air layer as $n_0$; angle of incidence of light emitted from the light sources and coming into the optical element, relative to the direction of optical axes, as $\theta_1$; angle of refraction of light, incident on the optical element, in the optical element as $\theta_2$; diameter of the light source as D; angles formed between a tangential line in contact with the outer surface of the luminance distribution generating layer and a plane orthogonal to the optical axes, as viewed in a sectional profile orthogonal to the longitudinal direction of the structural portions of the luminance distribution generating layer, as tangential angles ψ; and a tangential angle largest of all tangential angles ψ as maximum tangential angle a.

Accordingly, in the surface emission device, the optical element and the liquid crystal display device, at least part of the split images of the individual light sources positioned adjacent to each other may be overlapped.

The surface emission device of the present invention is a surface emission device having a plurality of light sources respectively shaped into a columnar form extending in a predetermined direction and disposed on the same plane as being extended in the same direction; an optical element having transparency and having, as formed therein, a luminance distribution generating layer suppressing variation, in the direction of optical axes, in luminance of light emitted from the plurality light sources; and a reflective surface positioned as being opposed to the optical element across the plurality of light sources, while keeping an air layer between the optical element and itself, and reflecting light emitted from the light sources, wherein the luminance distribution generating layer of the optical element being composed of a plurality of structural portions extending in the longitudinal direction of the light sources and projecting in the direction of optical axes. The surface emission device is characterized by, assuming distance between the centers of every adjacent light sources as L; refractive index of the optical element as n; thickness of the optical element as d; distance from the center of the light sources to the optical element in the direction of optical axes as W; refractive index of air in the air layer as $n_0$; angle of incidence of light emitted from the light sources and coming into the optical element, relative to the direction of optical axes, as $\theta_1$; angle of refraction of light, incident on the optical element, in the optical element as $\theta_2$; diameter of each light source as D; angles formed between a tangential line in contact with the outer surface of the luminance distribution generating layer and a plane orthogonal to the optical axes, as viewed in a sectional profile orthogonal to the longitudinal direction of the structural portions of the luminance distribution generating layer, as tangential angles ψ; and a tangential angle largest of all tangential angles ψ as maximum tangential angle a; having the optical element containing the maximum tangential angle a which satisfies x>L/2−D/2, when travel range x of a split image of the light sources in the direction normal to the optical axes is calculated using the conditional equation (1) to conditional equation (3) below.

$$n_0 \sin(a)=n \sin(a-\theta_2) \tag{1}$$

$$n_0 \sin \theta_1=n \sin \theta_2 \tag{2}$$

$$x=W \tan \theta_1+d \tan \theta_2 \tag{3}$$

The optical element of the present invention is an optical element being configured as having formed therein a luminance distribution generating layer suppressing variation, in the direction of optical axes, in luminance of light emitted from the plurality light sources respectively shaped into a columnar form extending in a predetermined direction and disposed on the same plane as being extended in the same direction, wherein the luminance distribution generating layer is composed of a plurality of structural portions extending in the longitudinal direction of the light sources and projecting in the direction of optical axes. The optical element is characterized by being, assuming distance between the centers of every adjacent light sources as L; refractive index of the optical element as n; thickness of the optical element as d; distance from the center of the light sources to the optical element in the direction of optical axes as W; refractive index of air in the air layer as $n_0$; angle of incidence of light emitted from the light sources and coming into the optical element, relative to the direction of optical axes, as $\theta_1$; angle of refraction of light, incident on the optical element, in the optical element as $\theta_2$; diameter of each light source as D; angles formed between a tangential line in contact with the outer surface of the luminance distribution generating layer and a plane orthogonal to the optical axes, as viewed in a sectional profile orthogonal to the longitudinal direction of the structural portions of the luminance distribution generating layer, as tangential angles ψ; and a tangential angle largest of all tangential angles ψ as maximum tangential angle a; configured so as to contain the maximum tangential angle a which satisfies x>L/2−D/2, when travel range x of a split image of the light sources in the direction normal to the optical axes is calculated using the conditional equation (1) to conditional equation (3) below.

$$n_0 \sin(a)=n \sin(a-\theta_2) \tag{1}$$

$$n_0 \sin \theta_1=n \sin \theta_2 \tag{2}$$

$$x=W \tan \theta_1+d \tan \theta_2 \tag{3}$$

The liquid crystal display device is a liquid crystal display device having a plurality of light sources respectively shaped into a columnar form extending in a predetermined direction and disposed on the same plane as being extended in the same direction; an optical element having transparency and having, as formed therein, a luminance distribution generating layer suppressing variation, in the direction of optical axes, in luminance of light emitted from the plurality light sources, the luminance distribution generating layer being composed of a plurality of structural portions extending in the longitudinal direction of the light sources and projecting in the direction of optical axes; a reflective surface positioned as being opposed to the optical element across the plurality of light sources, while keeping an air layer between the optical element and itself, and reflecting light emitted from the light sources; and a liquid crystal panel allowing thereon image display and irradiated with light emitted from the plurality of light sources. The liquid crystal display device is characterized by, assuming distance between the centers of every adjacent light sources as L; refractive index of the optical element as n; thickness of the optical element as d; distance from the center of the light sources to the optical element in the direction of optical axes as W; refractive index of air in the air layer as $n_0$; angle of incidence of light emitted from the light sources and coming into the optical element, relative to the direction of optical axes, as $\theta_1$; angle of refraction of light, incident on the optical element, in the optical element as $\theta_2$; diameter of each light source as D; angles formed between a tangential line in contact with the outer surface of the luminance distribution generating layer and a plane orthogonal to the optical axes, as viewed in a sectional profile orthogonal to the longitudinal direction of the structural portions of the luminance distribution generating layer, as tangential angles $\psi$; and a tangential angle largest of all tangential angles $\psi$ as maximum tangential angle a; having the optical element containing the maximum tangential angle a which satisfies x>L/2−D/2, when travel range x of a split image of the light sources in the direction normal to the optical axes is calculated using the conditional equation (1) to conditional equation (3) below.

$$n_0 \sin(a) = n \sin(a - \theta_2) \quad (1)$$

$$n_0 \sin \theta_1 = n \sin \theta_2 \quad (2)$$

$$x = W \tan \theta_1 + d \tan \theta_2 \quad (3)$$

Accordingly, in the surface emission device, the optical element and the liquid crystal display device of the present invention, at least part of the split images of the individual light sources positioned adjacent to each other may be overlapped, so that the front luminance distribution is ensured with a desirable level of uniformity, and thereby the non-uniformity in luminance may be suppressed.

Additional features and advantages of the present invention are described in, and will be apparent from, the following Detailed Description and the Figures.

BRIEF DESCRIPTION OF THE FIGURES

FIG. 31 is a drawing showing results of simulation of front luminance distribution observed when all light sources in the optical element having the luminance distribution generating layer shown in FIG. 26 are turned on.

FIG. 35 is a conceptual drawing showing an exemplary front luminance distribution observed when the light source and the optical element are disposed at a designed distance in a conventional surface emission device.

FIG. 36 is a conceptual drawing explaining problems in the conventional surface emission device.

DETAILED DESCRIPTION

Paragraphs below will explain best modes for carrying out the surface emission device, the optical element and the liquid crystal display device of the present invention, referring to the attached drawings.

Figure 1:
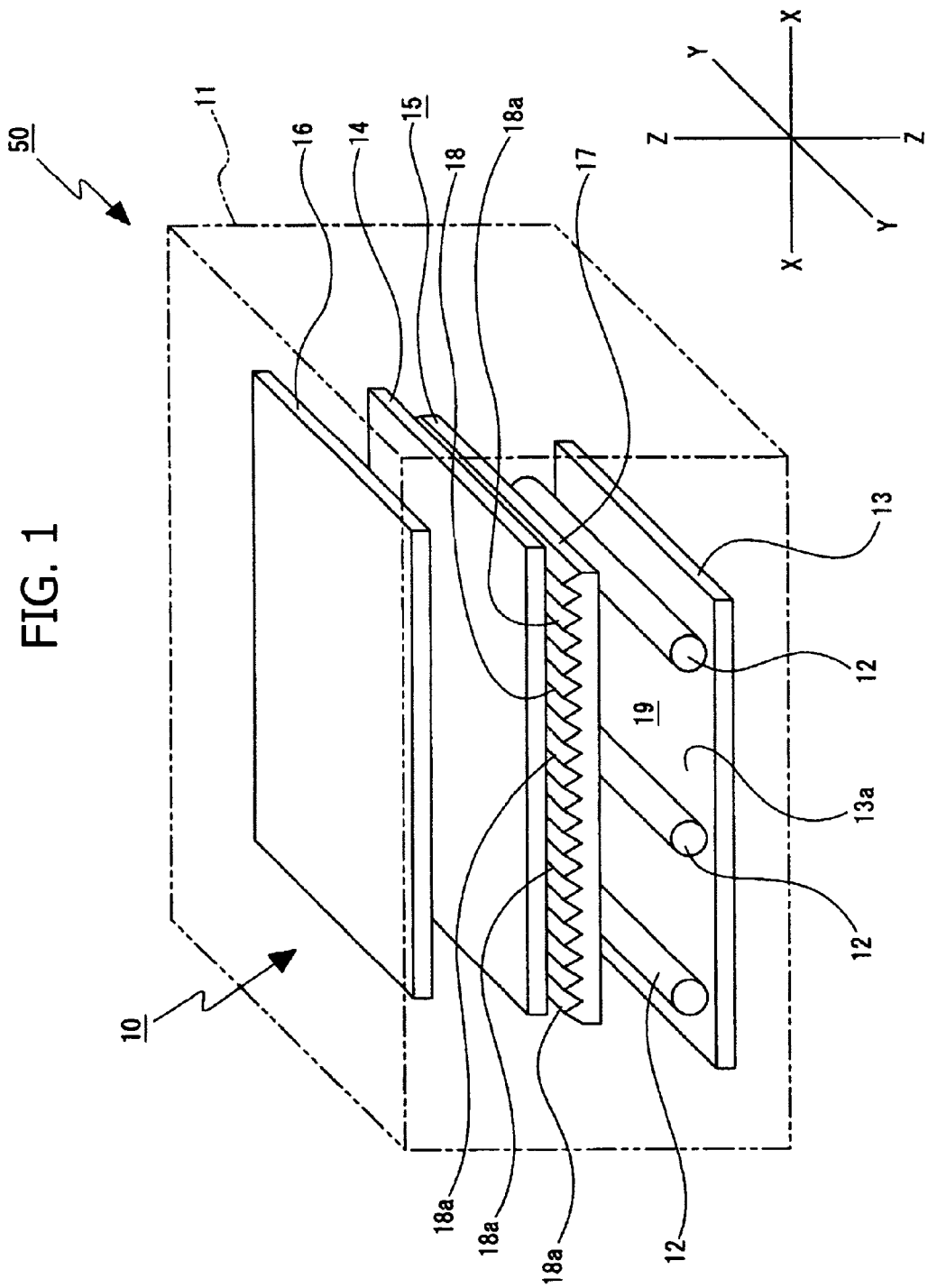
FIG. 1 is a schematic sectional view showing, together with FIG. 2 to FIG. 31, a best mode for embodying a surface emission device, optical element and liquid crystal display device of the present invention, in which this drawing shows a liquid crystal display device.

A surface emission device 10 is used as a direct-type backlight unit adapted to a liquid crystal display device 50 (see FIG. 1).

The surface emission device 10 has the individual components disposed in a housing 11, and is provided with a plurality of light sources (linear light sources) 12, 12, . . . , a reflective plate 13, a diffuser plate 14, an optical element (optical plate) 15 and an optical element component 16.

As the light sources 12, 12, . . . , fluorescent lamps such as cold cathode fluorescent lamps or hot cathode fluorescent lamps are adopted. The light sources 12, 12, . . . are respectively shaped into a columnar form, and are disposed on the reflective plate 13 as being extended in the Y-direction shown in FIG. 1. The light sources 12, 12, . . . are disposed at regular intervals in the X-direction shown in FIG. 1, between the reflective plate 13 and the optical element 15.

In the surface emission device 10, since a plurality of light sources 12, 12, . . . are disposed at regular intervals on the reflective surface 13a so as to ensure uniformity in the state of arrangement as shown in the above, so that light emitted from the light sources 12, 12, . . . is less likely to cause partial non-uniformity in luminance depending on the state of arrangement of the light sources 12, 12, . . . when it reaches a liquid crystal display panel described later.

The surface of the reflective plate 13 opposed to the light sources 12, 12, . . . is formed as the reflective surface 13a. Part of light emitted from the light sources 12, 12, . . . is reflected on the reflective surface 13a back to the optical element 15. The reflective plate 13 may be anything so far as it has a property of reflecting light, allowing use of a variety of those composed of aluminum, PET (polyethylene terephthalate), polycarbonate and so forth.

The diffuser plate 14 is disposed as being opposed to the light sources 12, 12, . . . across the optical element 15. The diffuser plate 14 has a function of diffusing light transmitted through the optical element 15 and uniformalizing a luminance distribution of the illumination flux emitted in the front direction, that is, front luminance distribution. Alternatively, in the surface emission device 10, also a thin diffuser sheet may be adoptable in place of the diffuser plate 14.

As the diffuser plate 14, those composed of polystyrene, cycloolefin polymer, acryl and polycarbonate may typically be used, whereas as the diffuser sheet, those capable of assisting diffusion of light, such as having filler particles coated on a PET base, may be used. Note that, although it is good enough to use at least either one of the diffuser plate 14 and diffuser sheet, they may be used in a stacked manner.

On the light extraction surface side of the diffuser plate 14, a liquid crystal display panel is disposed although not shown.

The optical element 15 is disposed between the light sources 12, 12, . . . and the diffuser plate 14. The optical element 15 is typically a prism sheet or a lenticular lens sheet having transmissivity of light, and is configured with a luminance distribution generating layer 18 formed on the light extraction surface side of a base 17 as being integrated therewith.

The base 17 is formed using a plate material made of a transparent synthetic resin such as acrylic resin, polyethylene terephthalate, polyethylene naphthalate, polycarbonate, styrene-base resin, styrene-methyl methacrylate copolymer resin and so forth. Note that, although the base 17 may alternatively be configured in a form of sheet or film, formation using a highly rigid plate material may be more preferable, because such base 17 may be less likely to sag, warp or deform by heat when incorporated into the housing 11, and less likely to vary the distance between the light source 12 and itself in the Z-direction. Thickness of the base 17 is not specifically limited, and even the thickness as small as that of sheet or film may be allowable so far as a predetermined rigidity may be ensured.

The luminance distribution generating layer 18 functions as suppressing variation in luminance in the front direction (Z-direction) of light emitted from the light sources 12. The luminance distribution generating layer 18 is configured with a plurality of structural portions 18a, 18a, . . . , having the direction of ridges thereof agreed with the Y-direction shown in FIG. 1, and the structural portions 18a, 18a, . . . are consecutively disposed in the X-direction at predetermined pitches. Each structural portion 18a is made project toward the Z-direction shown in FIG. 1, that is, the direction of optical axis of light emitted from the light source 12, and has an outer surface thereof typically formed into a curved profile or polygonal profile. The structural portion 18a formed into the curved profile may have an aspherical profile, for example.

Pitch of arrangement of the structural portions 18a, 18a, . . . is irrespective of the pitch of arrangement of the light sources 12, 12, . . . , wherein the structural portions 18a, 18a, . . . are arranged at micro pitches.

The luminance distribution generating layer 18 may be formed as being integrated with the base 17, but may be formed by transferring the luminance distribution generating layer 18 formed using a UV-curable resin onto the base 17, or may be formed by bonding the luminance distribution generating layer 18 to the base 17 by press forming.

The optical element component 16 is composed of one of, or a plurality of various optical elements such as diffuser sheet, prism sheet and reflective polarizer. For a case where the optical element component 16 is composed of a plurality of optical elements, these plurality of optical elements are disposed as being stacked. The optical element component 16 is disposed as being opposed to the optical element 15 across the diffuser plate 14.

In thus-configured surface emission device 10, a space between the reflective plate 13 and the optical element 15 is formed as an air layer 19.

In the surface emission device 10, once the light is emitted from the light sources 12, 12, . . . , the emitted light sequentially transmits the optical element 15, the diffuser plate 14 and the optical element component 16, and is irradiated onto the liquid crystal display panel. Part of the emitted light herein is reflected on the reflective surface 13a of the reflective plate 13, and is directed to the optical element 15.

The light incident on the optical element 15 is refracted on the plane of incidence of the optical element 15, and is again refracted also when it is emitted out from the optical element 15, and is then directed to the diffuser plate 14. The light incident on the diffuser plate 14 is extracted therefrom after being diffused, transmits through the optical element component 16, and reaches the liquid crystal display panel.

Figure 2:
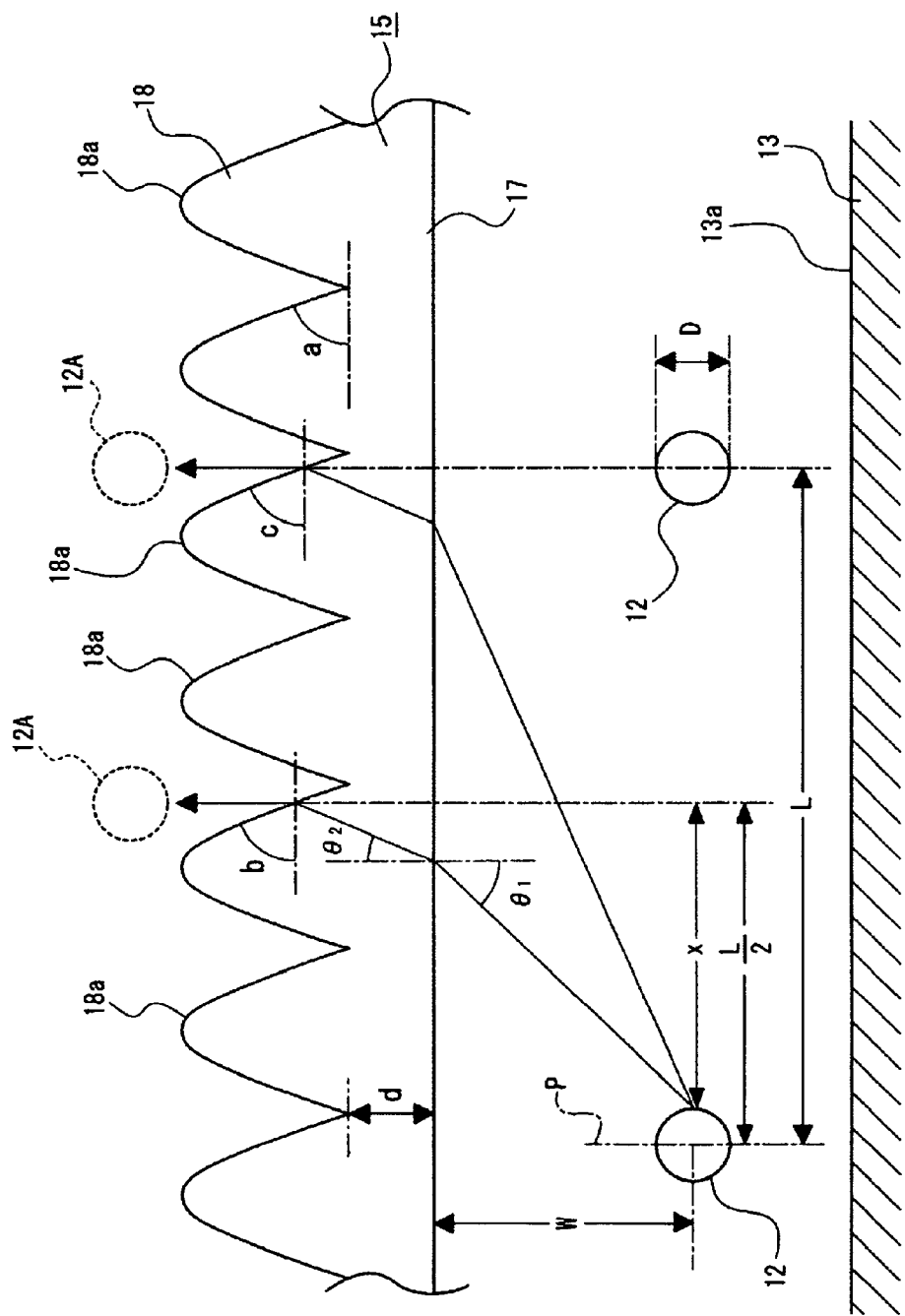
FIG. 2 is a conceptual drawing showing positional relation and so on of route of light emitted from light sources and the individual components.

FIG. 2 shows positional relations of route of light emitted from the light sources 12, 12, . . . and the individual components.

In FIG. 2, distance between the centers of every adjacent light sources 12, 12 is given as L, refractive index of the optical element 15 is given as n, thickness of the optical element 15 is given as d, distance from the center of the light source 12 to the optical element 15 in the direction of optical axes P is given as W, refractive index of air in the air layer 19 is given as $n_0$, angle of incidence of light emitted from the light source 12 and coming into the optical element 15, relative to the direction of optical axes P, is given as $\theta_1$, angle of refraction of light, incident on the optical element 15, in the optical element 15 is give as $\theta_2$, and diameter of the light source 12 is given as D.

It is noted that FIG. 2 shows the size of the structural portions 18a, 18a, . . . of the luminance distribution generating layer 18 as being emphasized with respect to the base 17 of the optical element 15, and that actual size of the structural portions 18a, 18a, is extremely smaller than that of the base 17.

Figure 3:
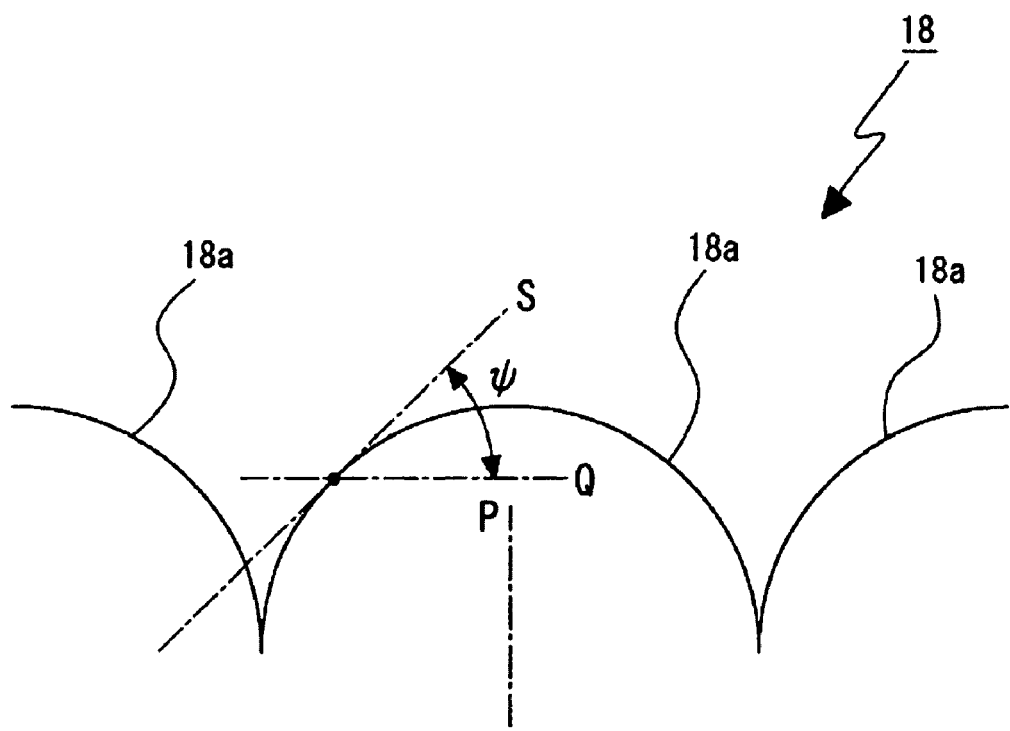
FIG. 3 is a conceptual drawing showing a tangential angle at a structural portion of a luminance distribution generating layer.

In addition, as shown in FIG. 3, in a sectional profile orthogonal to the longitudinal direction of the structural portions 18a, 18a, . . . of the luminance distribution generating layer 18, an angle formed between a tangential line S in contact with the outer surface of the structural portion 18a and a plane Q orthogonal to the optical axis P is given as tangential angle $\psi$. In this case, as shown in FIG. 2, a tangential angle largest of all tangential angles $\psi$ is given as maximum tangential angle a, and travel range of a split image 12A of the light source 12 in the direction normal to the optical axis P from the light source 12 is given as x. The travel range x represents a distance from the end face of the light source 12.

Using these factors (parameters), in the surface emission device 10, the equation (1) to equation (3) is held.

$$n_0 \sin(\psi) = n \sin(\psi - \theta_2) \tag{1}$$

$$n_0 \sin\theta_1 = n \sin\theta_2 \tag{2}$$

$$x = W \tan\theta_1 + d \tan\theta_2 \tag{3}$$

With these equation (1) to equation (3), substituting an arbitrary tangential angle $\psi$ in the equation (1) yields the angle of refraction $\theta_2$, substituting the calculated $\theta_2$ in the equation (2) yields the angle of incidence $\theta_1$, and substituting the calculated $\theta_1$ and $\theta_2$ in the equation (3) yields the travel range x. As a consequence, the travel range x corresponding to the tangential angle $\psi$ is unconditionally determined, and a split image 12A of light reached the point of contact of the luminance distribution generating layer 18 having the tangential angle $\psi$ is shifted towards the adjacent light source 12 to as much as x.

As described in the above, the travel range x of the split image 12A is determined by the tangential angle $\psi$, and assuming now that a tangential angle, out of all tangential angles $\psi$, under which the split image 12A of the light source 12 reaches L/2 is given as b, and a tangential angle, out of all tangential angles $\psi$, under which the split image 12A of the light source 12 reaches L, that is, the center of the adjacent light source 12, is given as c, tangential angle $\psi$ satisfying $$x = L/2 - D/2 \tag{4}$$

equals tangential angle b. (L/2−D/2) stands for the middle position between the individual centers of the adjacent light sources 12, 12. Accordingly, if any tangential angle $\psi$ satisfying the equation (5) below should reside, the individual split images 12A, 12A of the adjacent light sources 12, 12 should overlap:

$$x > L/2 - D/2 \tag{5}$$

As described in the above, presence of tangential angle $\psi$ satisfying the equation (5) means overlapping of the individual split images 12A, 12A of the adjacent light sources 12, 12, and this means that, if the maximum tangential angle a, allowing thereunder the equation (5) to hold, should reside in the luminance distribution generating layer 18, the individual split images 12A, 12A of the adjacent light sources 12, 12 may overlap.

In the surface emission device 10, the optical element 15 is formed so that the maximum tangential angle a, allowing thereunder the equation (5) to hold, may reside in the luminance distribution generating layer 18, and so that the individual split images 12A, 12A of the adjacent light sources 12, 12 may overlap.

Figure 4:
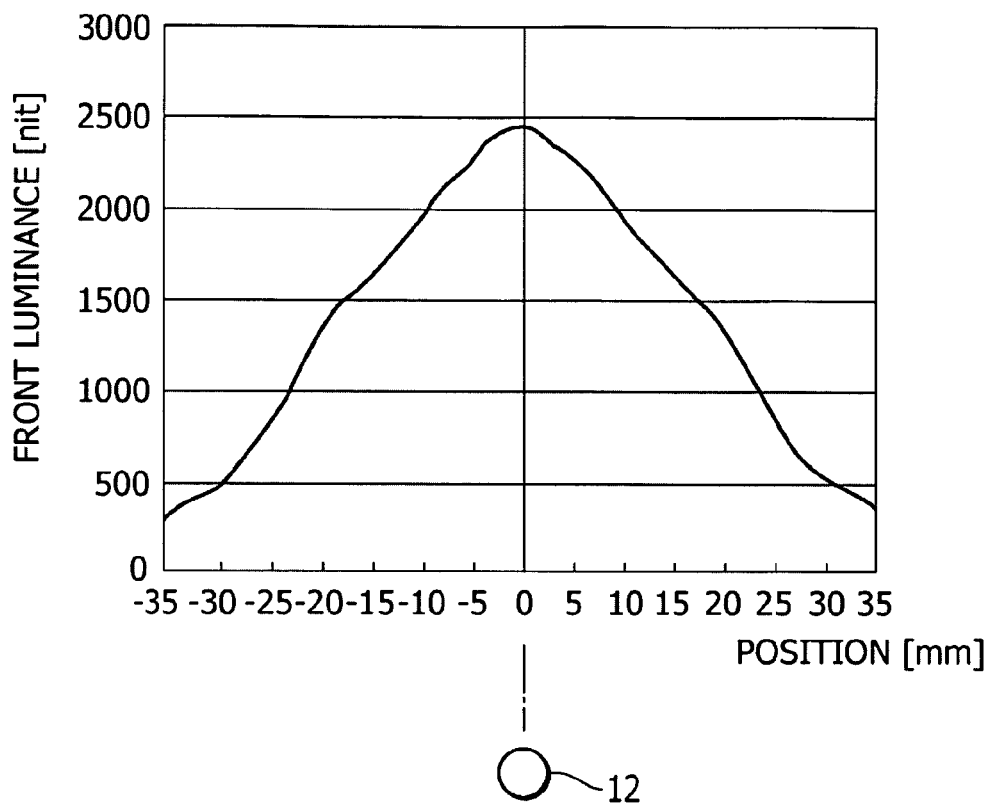
FIG. 4 is a graph showing a front luminance distribution observed in a state where light is emitted from a single light source.

FIG. 4 is a graph showing a front luminance distribution given by light emitted from a single light source 12 after transmitting through the optical element 15 and before entering the diffuser plate 14.

As shown in FIG. 4, the front luminance distribution shows a near-triangle profile maximized in the luminance level at a position straightly above the light source 12, and sloping down towards the positions straightly above the adjacent light sources 12. The front luminance distribution shown in FIG. 4 is slightly deformed as compared with a front luminance distribution having a triangle profile, wherein such deformation is ascribable to action of light reflected on the reflective plate 13.

Figure 5:
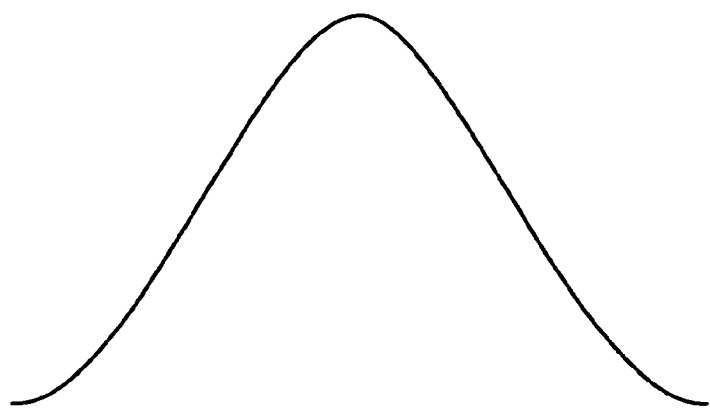
FIG. 5 is a conceptual drawing showing, together with FIG. 6 and FIG. 7, an exemplary front luminance distribution, wherein this drawing shows that having a near-triangle profile with a rounded apex.
Figure 6:
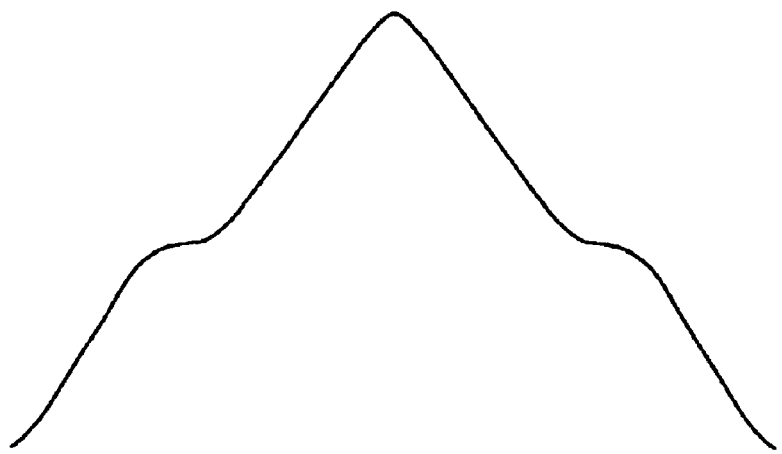
FIG. 6 is a conceptual drawing showing an example having shoulders on the inclined portions thereof.
Figure 7:
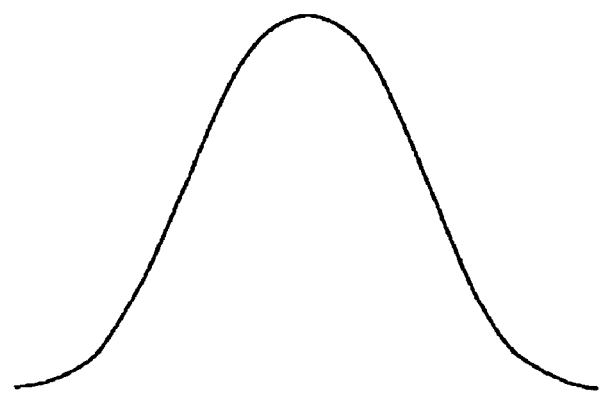
FIG. 7 is a conceptual drawing showing an example having step-wisely varied slope on the inclined portions.

Profile of the front luminance distribution obtained immediately after being emitted from the light source 12 is not limited to the triangle profile, but may also be a near-triangle profile with a rounded apex (see FIG. 5), profile having shoulders on the inclined portions thereof (see FIG. 6), a profile having step-wisely varied slope on the inclined portions (see FIG. 7), and so forth.

Figure 8:
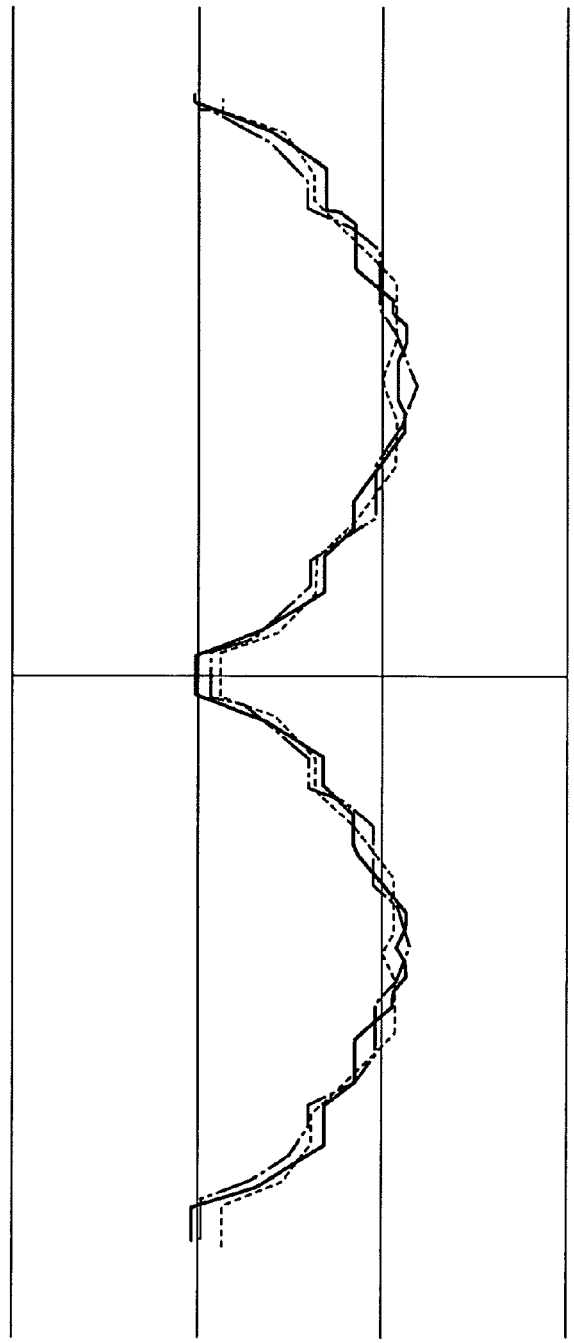
FIG. 8 is a graph showing front luminance distribution of light before transmitting a diffuser plate, under varied distance between the light source and the optical element.

FIG. 8 is a graph showing front luminance distribution of light before transmitting through a diffuser plate 14 under varied distance W, for the case where the split images 12A, 12A, . . . of the plurality of light sources 12, 12, . . . overlap, collectively showing a front luminance distribution observed under a designed distance W, and front luminance distributions observed under ±8% shift from the distance W.

The front luminance distributions shown in FIG. 8 express results obtained by the Monte Carlo simulation of light emitted from the light sources 12, 12, . . . reflected, refracted and scattered by the reflective plate 13 and the optical element 15, conforming to probabilities according to the optical characteristics.

In FIG. 8, every single light source 12 has a front luminance distribution maximized at the position straightly above the light source 12, and sloping down towards the positions straightly above the adjacent other light sources, wherein at the middle point between two adjacent light sources 12, 12, the split images 12A, 12A of two these light sources 12, 12 overlap, and parts of the individual front luminance distributions overlap.

If the split images 12A, 12A do not overlap, width of trail (width in the direction of arrangement of the light sources 12, 12, . . . ) of the front luminance distribution of the individual light sources 12, 12, . . . may fluctuate, when the distance W between the light sources 12 and the optical element 15 varied, and thereby the front luminance distribution may largely vary. For example, when the distance W becomes larger than the designed distance W, the width of trail of the front luminance distribution of the individual light sources 12, 12, . . . overlap, and on the contrary when the distance W becomes smaller than the designed distance W, the luminance level decreases at a point (middle point) between every adjacent light sources 12, 12, . . . , largely modifying the front luminance distribution.

In contrast, in the surface emission device 10, the split images 12A, 12A, . . . of the light sources 12, 12, . . . preliminarily overlap under the designed distance W, and part of the individual front luminance distributions overlap with each other, so that fluctuation in the luminance level relative to changes in the distance W between the light sources 12, 12, . . . and the optical element 15 may be suppressed, and as shown in FIG. 8, changes in the front luminance distribution may be small even if the distance W changes, and thereby non-uniformity in luminance may be suppressed.

In addition, because the non-uniformity in luminance ascribable to changes in the distance W between the light sources 12, 12, . . . and the optical element 15 may be suppressed, the degree of freedom in the arrangement of the optical element 15 relative to the housing 11 may be improved, and thereby workability in the process of assembling the individual components may be improved.

Moreover, overlapping of the split images 12A, 12A, . . . of the light sources 12, 12, . . . is synonymous to widening of the width of trail of the front luminance distribution, and this raises a property of making the front luminance distribution per se less susceptible to changes in the distance W.

Figure 9:
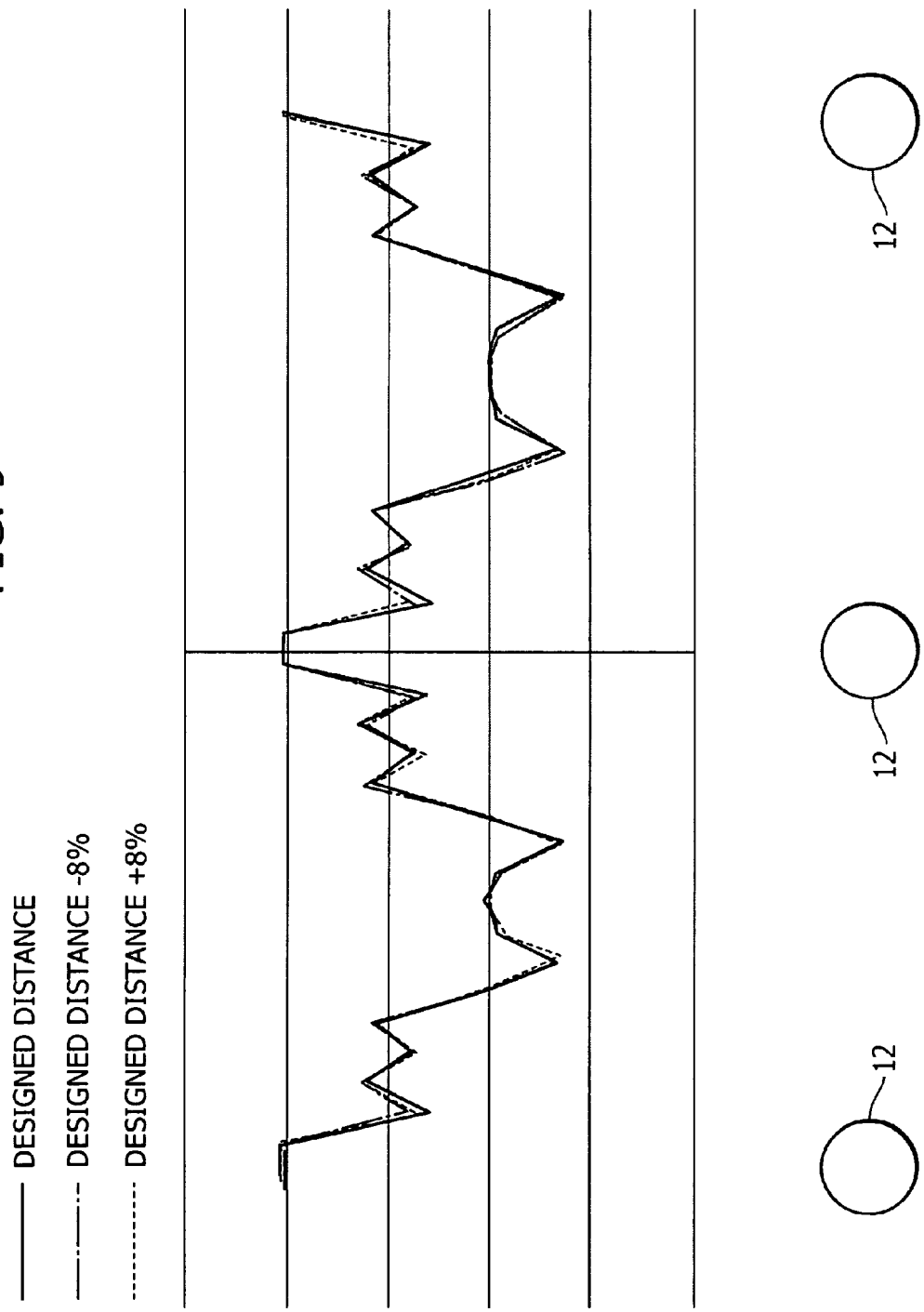
FIG. 9 is a graph showing front luminance distribution of light before transmitting a diffuser plate, under varied distance between the light source and the optical element, for a case where split images of the light source slightly overlap.

FIG. 9 is a graph showing front luminance distribution of light before transmitting through a diffuser plate 14 under varied distance W, for a case where the split images 12A, 12A, . . . of the light sources 12, 12, . . . slightly overlap at the middle point of between the light sources 12, 12, collectively showing a front luminance distribution observed under a designed distance W, and front luminance distributions observed under ±8% shift from the distance W.

The front luminance distributions shown in FIG. 9 express results obtained by the Monte Carlo simulation for the case of reflection, refraction and scattering conforming to probabilities according to the optical characteristics, similarly to as shown in FIG. 8.

Also for the case where the split images 12A, 12A, . . . of the light sources 12, 12, . . . slightly overlap as shown in FIG. 9, it was confirmed that fluctuation in the luminance level relative to changes in the distance W between the light sources 12, 12, . . . and the optical element 15 may be suppressed, and that changes in the distance W resulted in only small changes in the front luminance distribution, so that non-uniformity in luminance may be suppressed. As a consequence, as described in the above, the degree of freedom in designing the distance W may be improved, by virtue of overlapping of the split images 12A, 12A, . . . of the light sources 12, 12, . . . , and spreading of the width of trail of the front luminance distribution correlative to spreading of the split images 12A, 12A, . . . .

Paragraphs below will show specific examples of configuration of the surface emission device 10, capable of suppressing non-uniformity in luminance (see FIG. 10 to FIG. 21).

In general, in thin-type liquid crystal display devices, the diameter D of the light sources (cold cathode fluorescent lamps) is 3.0 mm to 4.0 mm, the distance L between the centers of every adjacent light sources is 20 mm to 40 mm, and the distance W from the center of the light source to the optical element in the direction of optical axis is 6.0 mm to 16.0 mm. As the optical element, engineering plastics low in price and adapted to mass production are used, wherein the thickness d of the optical element is 0.3 mm to 2.0 mm, and the refractive index n is 1.50 to 1.63. Refractive index $n_0$ of air is approximately 1.0.

Figure 10:
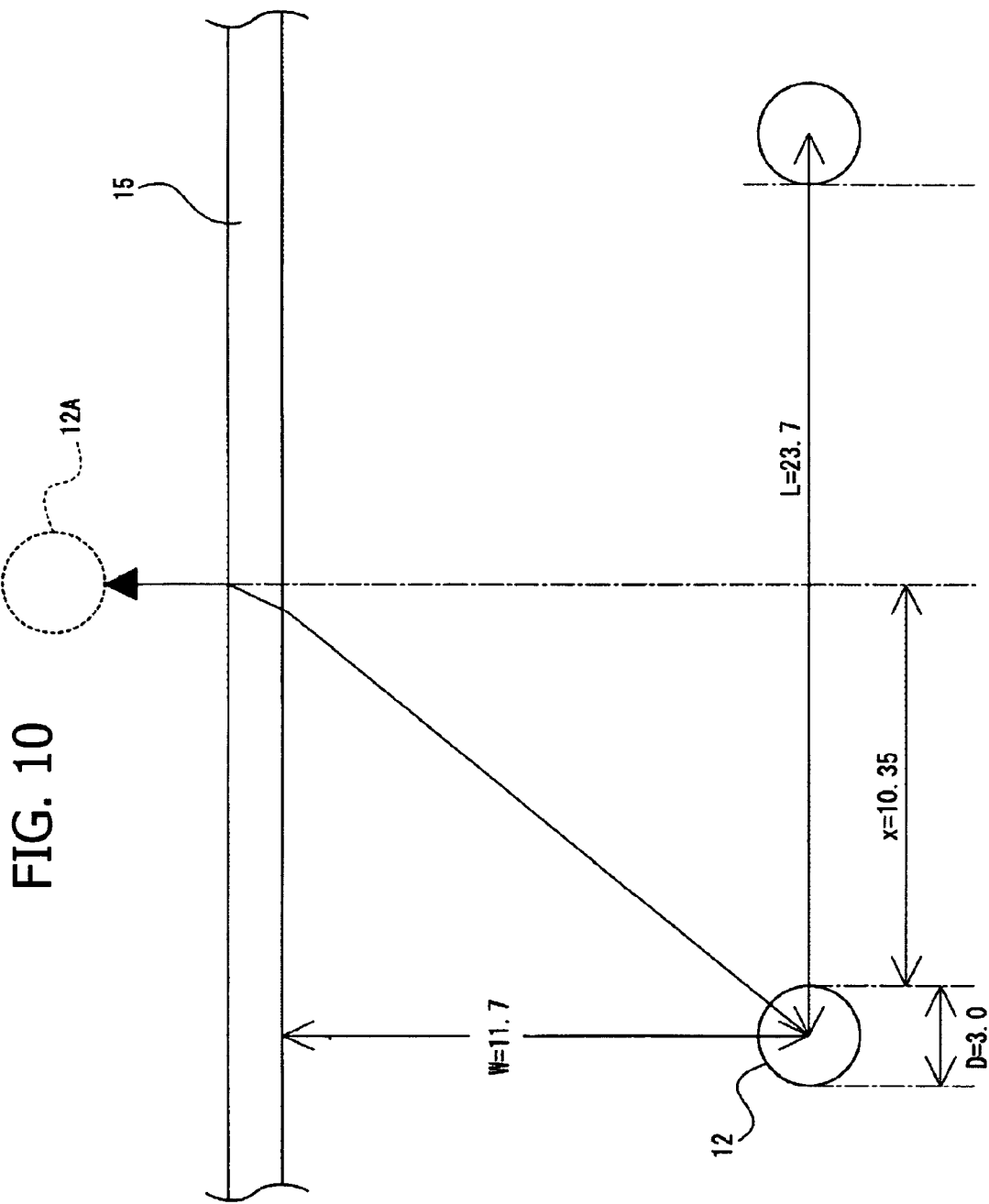
FIG. 10 is a conceptual drawing showing a specific example of travel range of the split image of the light source, in the direction normal to the optical axes of the light sources.

For example, assuming W=11.7 mm and D=3.0 mm under L=23.7 mm, as shown in FIG. 10, the split images may overlap if the travel range x=L/2−D/2 of the split images of the light sources in the direction normal to the optical axis is 10.35 mm or larger.

Figure 11:
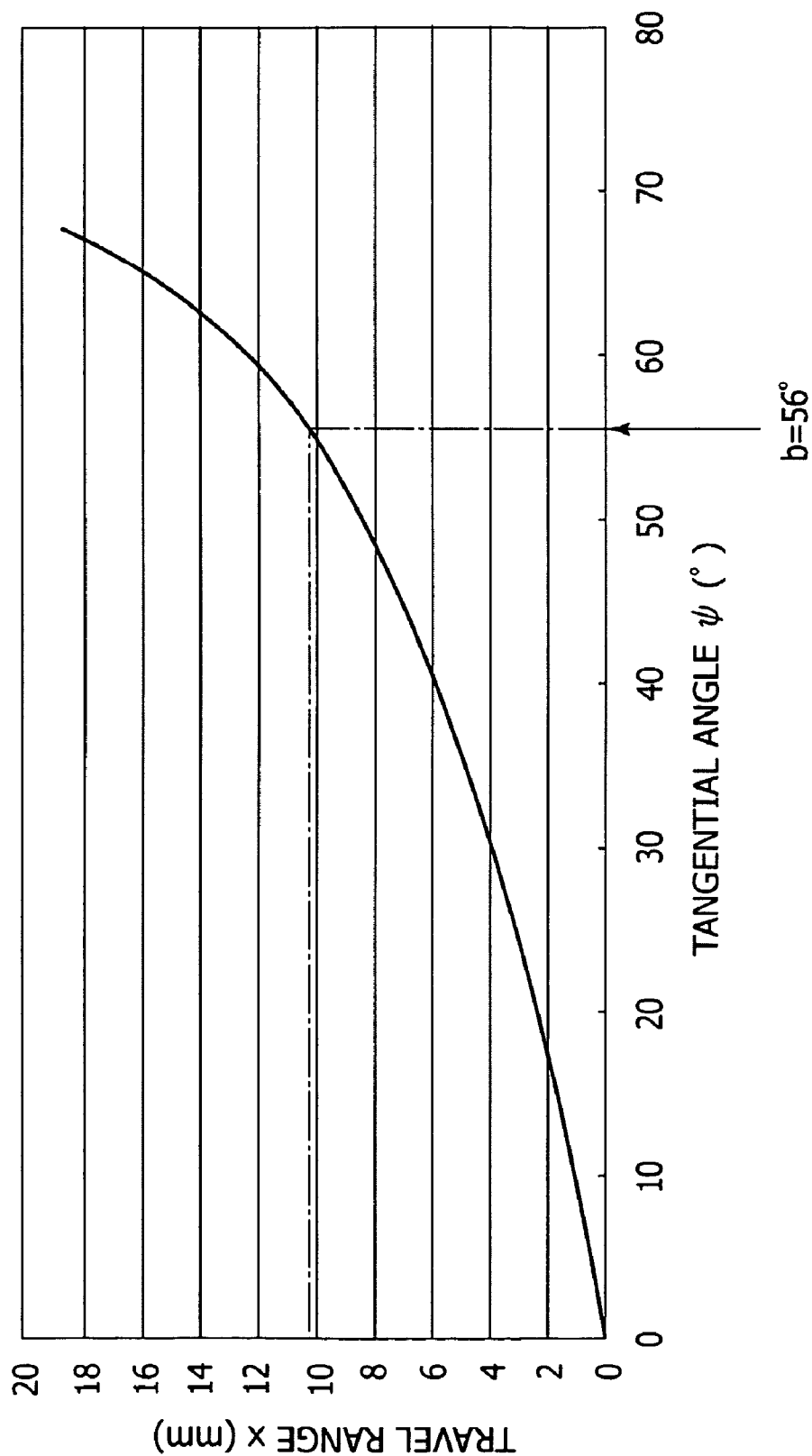
FIG. 11 is a graph showing a relation between tangential angle of the luminance distribution generating layer and travel range of the split image of the light source.

In this case, given with d=0.4 mm and n=1.585, the tangential angle ψ of the optical element and the travel range x may be in relation as shown in FIG. 11, based on the equation (1) to the equation (3). From FIG. 11, the tangential angle b giving x=10.35 mm is found to be approximately 56°. As a consequence, when the parameters adoptable to the general thin-type liquid crystal display devices are given as L=23.7 mm, W=11.7 mm, D=3.0 mm, d=0.4 mm, n=1.585 and $n_0$=1.0, it is necessary for the luminance distribution generating layer of the optical element to have a profile with a maximum tangential angle a equal to or larger than the tangential angle ψ=56°.

As described in the above, by determining all parameters, that is, the distance L between the individual centers of every adjacent light sources, the refractive index n of the optical element, the thickness d of the optical element, the distance W from the center of the light source to the optical element in the direction of optical axis, the refractive index n0 of air in the air layer, and the diameter D of the light source, a profile required for the luminance distribution generating layer of the optical element may be determined by the tangential angle calculated using the equation (1) to equation (3).

Maximum values ($b_{max}$) and minimum values ($b_{min}$) of the tangential angle b calculated within the ranges of L=20 mm to 40 mm, W=6.0 mm to 16.0 mm, D=3.0 mm to 4.0 mm, d=0.3 mm to 2.0 mm, n=1.50 to 1.63, which are the parameters generally adopted to the liquid crystal display devices, are shown in Table 1.

For an exemplary case with L/W=3.0, (L/2−D/2) shows a maximum value under L=40 mm, W=13.3 mm, D=3.0 mm, and a maximum value ($b_{max}$) is shown under n=1.50, d=0.3 mm.

TABLE 1

| L/W | bmin(°) | bmax(°) |
|---|---|---|
| 1.5 | 40 | 54 |
| 1.6 | 43 | 56 |
| 1.7 | 45 | 58 |
| 1.8 | 47 | 60 |
| 1.9 | 48 | 62 |
| 2.0 | 50 | 63 |
| 2.1 | 52 | 64 |
| 2.2 | 53 | 66 |
| 2.3 | 55 | 67 |
| 2.4 | 56 | 68 |
| 2.5 | 57 | 69 |
| 2.6 | 58 | 70 |
| 2.7 | 59 | 71 |
| 2.8 | 60 | 71 |
| 2.9 | 61 | 72 |
| 3.0 | 61 | 73 |
| 3.1 | 62 | 73 |
| 3.2 | 63 | 74 |
| 3.3 | 63 | 74 |
| 3.4 | 64 | 75 |
| 3.5 | 64 | 75 |
| 3.6 | 65 | 76 |
| 3.7 | 65 | 76 |
| 3.8 | 66 | 76 |
| 3.9 | 66 | 77 |
| 4.0 | 67 | 77 |

If maximum tangential angle a larger than the tangential angle b shown in Table 1 should reside in the luminance distribution generating layer 18, the split images 12A, 12A, . . . of the light sources 12, 12, . . . may overlap, so that in the surface emission device 10, the optical element 15 is formed so that the maximum tangential angle a larger than the tangential angles b shown in Table 1 may reside in the luminance distribution generating layer 18.

Accordingly, in the surface emission device 10, the split images 12A, 12A, . . . of the light sources 12, 12, . . . overlap, so that changes in the distance W from the center of the light source 12 to the optical element 15 in the direction of optical axis P may result in only small changes in the front luminance distribution, thereby the non-uniformity in luminance may be suppressed.

Figure 12:
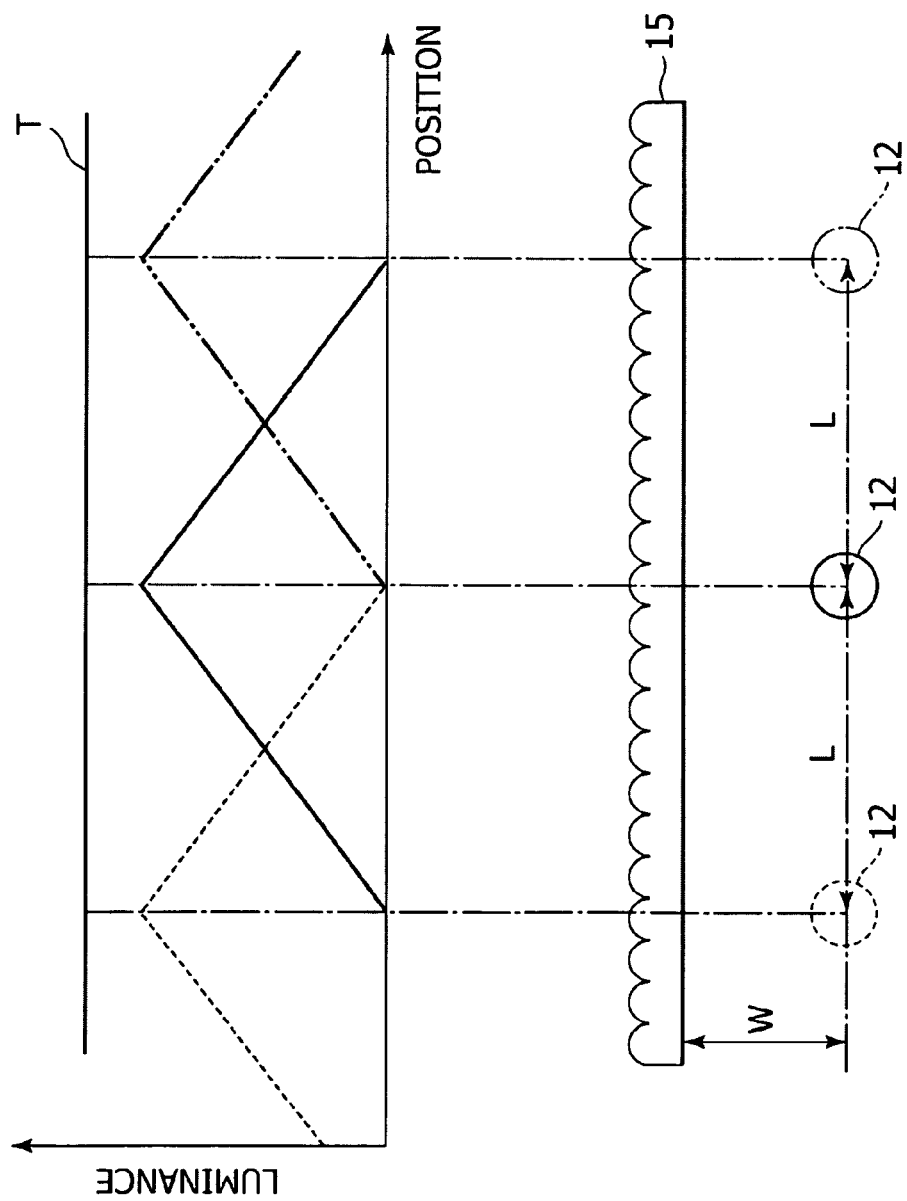
FIG. 12 is a graph showing a front luminance distribution observed when the split image of the light source moves to the adjacent light source.

A more preferable front luminance distribution may be exemplified by a case shown in FIG. 12, in which split image 12A reaches the position straightly above both adjacent light sources 12, 12. In order to obtain this sort of front luminance distribution, the tangential angle ψ satisfying x=L−D/2 may be the maximum tangential angle a, so that it is good enough that the tangential angle c under which the split image 12A of the light source 12 reaches the center of the adjacent light source 12 may agree with the maximum tangential angle a. It is to be noted that straight line T shown in FIG. 12 represents the front luminance distribution obtained by summing up the front luminance distributions of the individual light sources 12, 12, . . . .

Table 2 shows maximum values ($c_{max}$) and minimum values ($c_{min}$) of the tangential angle c using the parameters same as those used for calculating the values in Table 1, including L=20 mm to 40 mm, W=6.0 mm to 16.0 mm, D=3.0 mm to 4.0 mm, d=0.3 mm to 2.0 mm, and n=1.50 to 1.63.

TABLE 2

| L/W | Cmin(°) | Cmax(°) |
|---|---|---|
| 1.5 | 61 | 73 |
| 1.6 | 63 | 74 |
| 1.7 | 64 | 75 |
| 1.8 | 65 | 76 |
| 1.9 | 66 | 76 |
| 2.0 | 67 | 77 |
| 2.1 | 67 | 78 |
| 2.2 | 68 | 78 |
| 2.3 | 68 | 78 |
| 2.4 | 69 | 79 |
| 2.5 | 69 | 79 |
| 2.6 | 70 | 80 |
| 2.7 | 70 | 80 |
| 2.8 | 70 | 80 |
| 2.9 | 71 | 80 |
| 3.0 | 71 | 81 |
| 3.1 | 71 | 81 |
| 3.2 | 71 | 81 |
| 3.3 | 72 | 81 |
| 3.4 | 72 | 81 |
| 3.5 | 72 | 81 |
| 3.6 | 72 | 82 |
| 3.7 | 72 | 83 |
| 3.8 | 72 | 84 |
| 3.9 | 72 | 84 |
| 4.0 | 72 | 84 |

It may therefore be said that, if the maximum tangential angle a same as the tangential angle c shown in Table 2 should reside in the luminance distribution generating layer 18, the split images 12A, 12A, . . . of the light sources 12, 12, . . . may overlap over the entire range between every adjacent light sources 12, 12, . . . .

In addition, in order to obtain the front luminance distribution shown in FIG. 12, it may be necessary that, assuming the luminance level at the position straightly above the light source 12 as 1, the luminance level of the split image 12A of this light source 12 at the middle point between itself and the adjacent light source 12 is approximately halved to as low as 0.4 to 0.6 or around, and the luminance level at the position straightly above the adjacent light source 12 is approximately 0. Accordingly, it may be necessary that the maximum tangential angle a of the optical element 15 is approximately same with the tangential angle c shown in Table 2, and that the luminance distribution generating layer 18 contains portions with a tangential angle of b or larger and smaller than c to as much as 40% to 60%. The tangential angle b is an angle under which the split image 12A of the light source 12 reaches L/2, as described in the above, and the tangential angle c is an angle under which the split image 12A of the light source 12 reaches L.

In the surface emission device 10, the optical element 15 is formed so that the maximum tangential angle a almost equal to the tangential angle c such as shown in Table 2 resides in the luminance distribution generating layer 18, and that the portions with a tangential angle of b or larger and smaller than c are contained to as much as 40% to 60% in the optical luminance distribution generating layer 18.

Accordingly, in the surface emission device 10, the split images 12A, 12A, . . . of the light sources 12, 12, . . . overlap over the entire region between the individual light sources 12, 12, . . . , so that changes in the distance W from the center of the light source 12 to the optical element 15 in the direction of optical axis P may result in only small changes in the front luminance distribution, thereby the non-uniformity in luminance may be suppressed.

Figure 13:
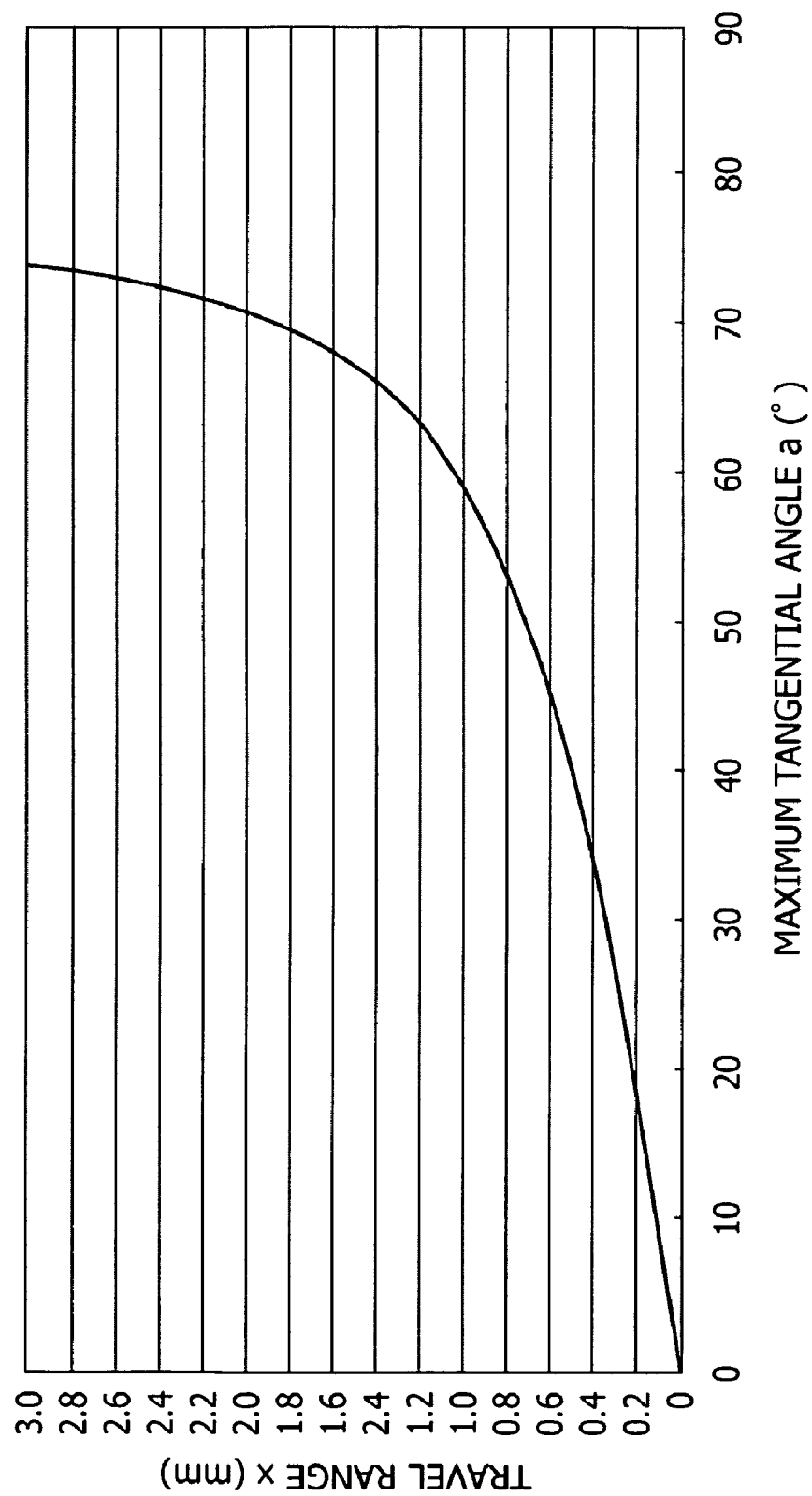
FIG. 13 is a graph showing a relation between the maximum tangential angle of the luminance distribution generating layer and the travel range of split image of the light source.

FIG. 13 is a graph showing a relation between the maximum tangential angle a and the travel range x of the split image, assuming the distance W from the center of the light source to the optical element in the direction of optical axis as 1, the diameter D of light source as 0.25, giving W/D=4, the refractive index n of the optical element as 1.585, and the thickness d of the optical element as 0.4 mm.

As shown in FIG. 13, rate of change of the maximum tangential angle a increases as the travel range x increases. Since increase in L/W, expressing a ratio of the distance L between every adjacent light sources with respect to the distance W from the center of the light source to the optical element in the direction of optical axis, results in increase also in the travel range x, so that increase in L/W results in increase in the amount of change of travel range x relative to change in the maximum tangential angle a.

As described above, the increase in the rate of change of maximum tangential angle a makes formation of the luminance distribution generating layer difficult. Accordingly, increase in L/W makes formation of the luminance distribution generating layer difficult, and consequently makes control of the maximum tangential angle a difficult.

The maximum tangential angle a may be controllable in the range of L/W of 2.5 or smaller, so that non-uniformity in luminance may appropriately be suppressed in the range of Table 2 with L/W of 2.5 or smaller.

Figure 14:
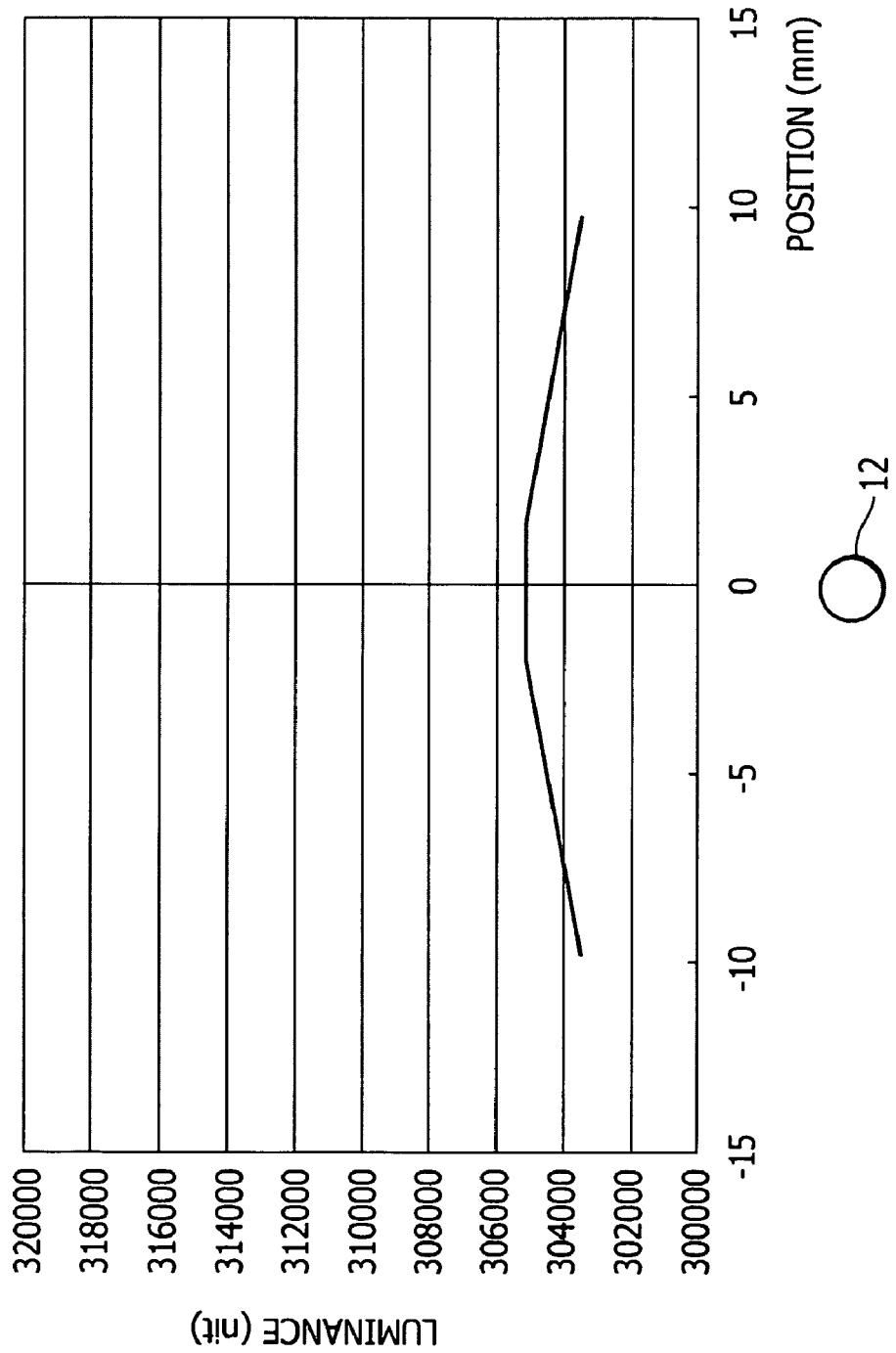
FIG. 14 is a graph showing a front luminance distribution in a state where light emitted from the light source is transmitted through the diffuser plate, when the light source and the optical element keep a designed distance therebetween.
Figure 15:
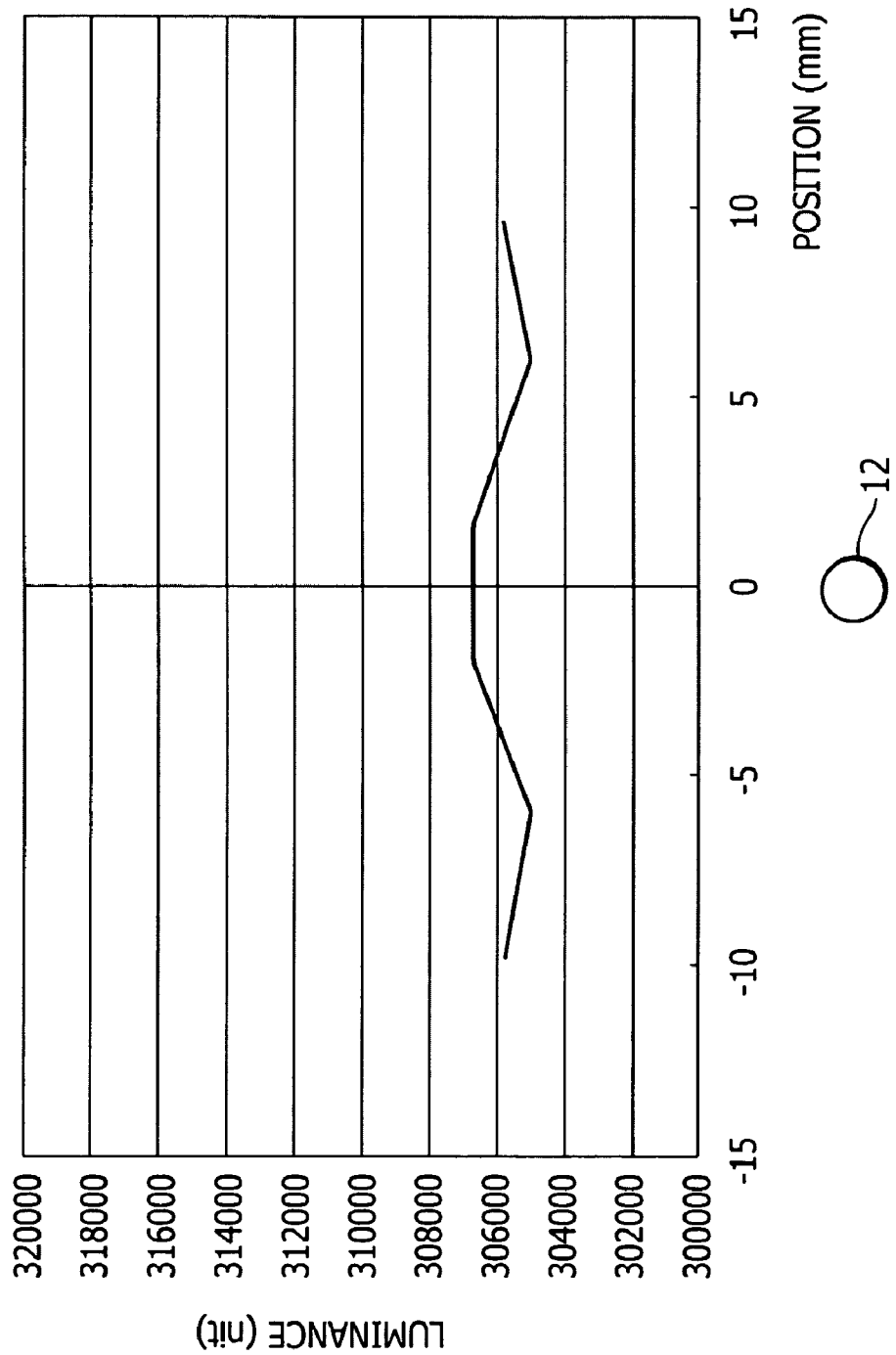
FIG. 15 is a graph showing a front luminance distribution in a state where light emitted from the light source transmitted through the diffuser plate, when the split images of the light source slightly overlap, and when the light source and the optical element keep a designed distance therebetween.

FIG. 14 and FIG. 15 are graphs showing front luminance distributions in the states where light emitted from the light source 12 transmitted through the optical element 15 and the diffuser plate 14. FIG. 14 is a graph corresponding to a front luminance distribution when the designed distance W shown in FIG. 8 is kept, and FIG. 15 is a graph corresponded to a front luminance distribution when the designed distance W shown in FIG. 9 is kept.

As shown in FIG. 14 and FIG. 15, the front luminance distribution is made almost uniform, in the state of light after being transmitted through the diffuser plate 14 by virtue of diffusing function of the diffuser plate 14.

By using the diffuser plate 14 in this way, the front luminance distribution may be made uniform, and the non-uniformity in luminance may be prevented from occurring.

As described in the above, since the front luminance distribution may be made uniform by using the diffuser plate 14, in the state of light emitted from the light sources 12, 12, . . . and before being transmitted through the diffuser plate 14, the front luminance distribution may be made uniform if large difference between the maximum values and the minimum values of the luminance in the front luminance distribution is avoidable.

An allowable range of ratio of the maximum values and the minimum values of the luminance level, under which the front luminance distribution may be made uniform by the action of the diffuser plate 14, may be 0.7 or larger, for example, taking the action of the diffuser plate into consideration.

Figure 16:
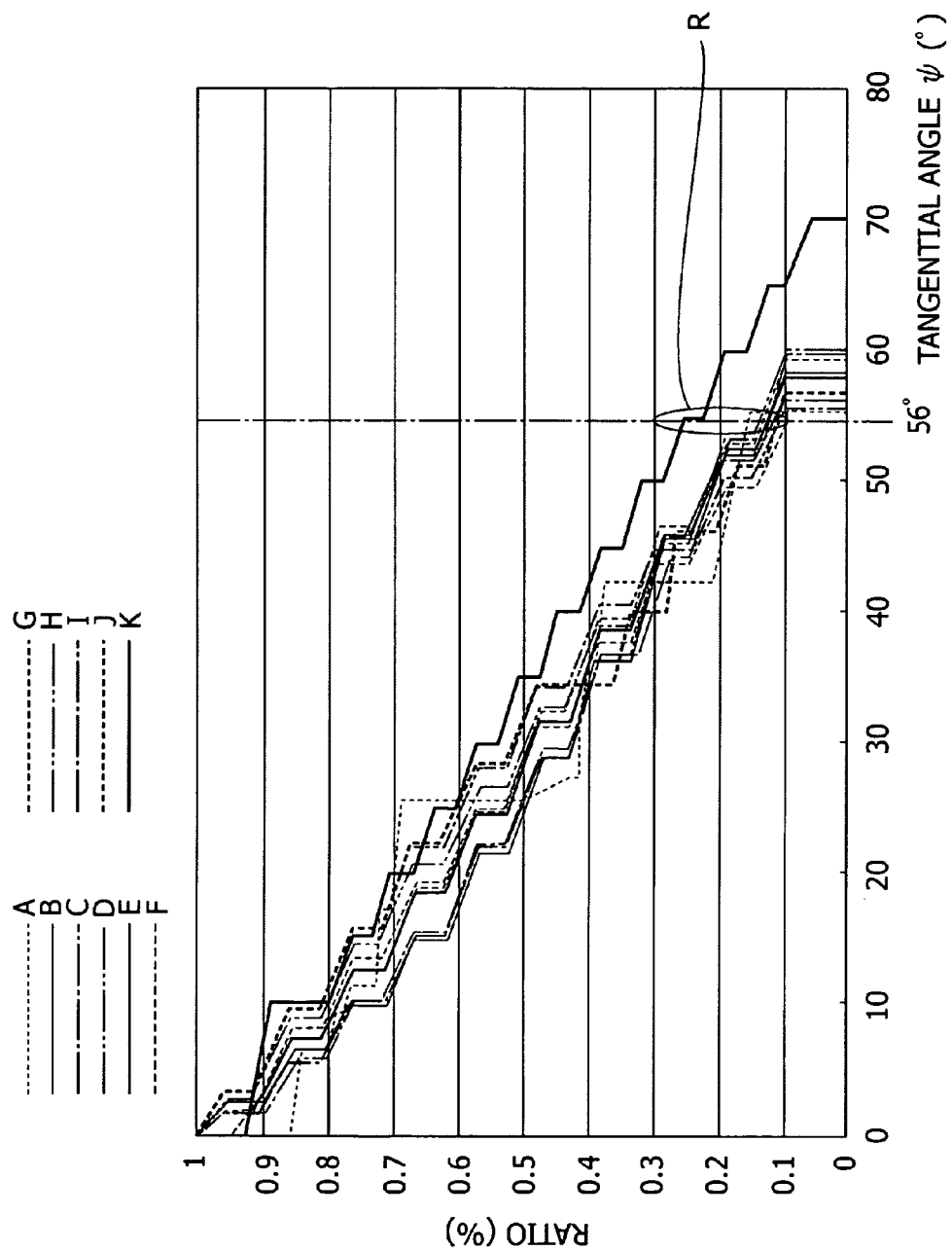
FIG. 16 is a graph showing tangential angle and its ratio for samples having small incidence of non-uniformity in luminance.
Figure 17:
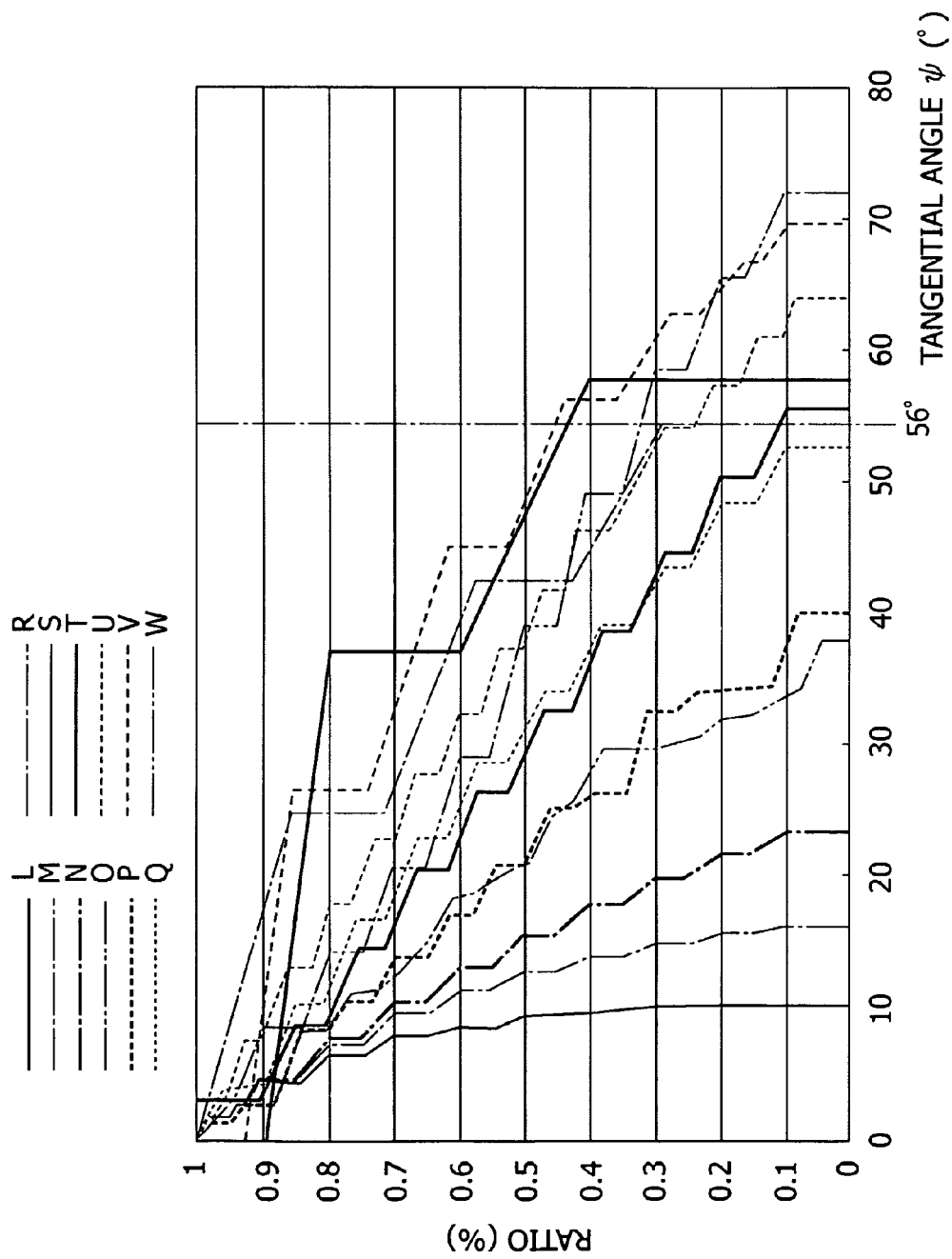
FIG. 17 is a graph showing tangential angle and its ratio for samples having large incidence of non-uniformity in luminance.

FIG. 16 and FIG. 17 are graphs plotting on the ordinate the tangential angle $\psi$, and plotting on the abscissa the ratio of content of such tangential angle $\psi$ in the luminance distribution generating layer, obtained when 23 samples in total were investigated into the state of non-uniformity in luminance.

FIG. 16 and FIG. 17 are graphs, showing data similarly as in FIG. 13, expressing relations between the tangential angle $\psi$ and the ratio of such tangential angle $\psi$, assuming the distance W from the center of the light source to the optical element in the direction of optical axis as 1, the diameter D of light source as 0.25, giving W/D=4, the refractive index n of the optical element as 1.585, and the thickness d of the optical element as 0.4 mm. Note that a ratio of the distance L between the centers of every adjacent light sources relative to the distance W herein is given as L/W=2.0, and transmissivity of light of the diffuser plate is 60%.

FIG. 16 shows data of 11 samples (A to K) having ratios of the maximum values and the minimum values of the luminance level in the front luminance distribution of light before being transmitted through the diffuser plate of 0.7 or larger, causative of only small incidence of non-uniformity in luminance, and therefore ensured with desirable uniformity in the front luminance distribution.

On the other hand, FIG. 17 shows data of 12 samples (L to W) having ratios of the maximum values and the minimum values of the luminance level in the front luminance distribution of light before being transmitted through the diffuser plate of smaller than 0.7, causative of large incidence of non-uniformity in luminance, and therefore failed in ensuring desirable uniformity in the front luminance distribution.

As shown in FIG. 16, data corresponding to small incidence of non-uniformity in luminance indicate that all samples contain the portions with the tangential angle $\psi$ larger than the tangential angle b=56° in the luminance distribution generating layer, and that the portions with the tangential angle b (=56°) are contained approximately to as much as 10% to 30% of all tangential angles $\psi$ (indicated by R in FIG. 16).

On the other hand, the data corresponding to large incidence of non-uniformity in luminance shown in FIG. 17 involves samples (L, M, N, O, P, Q) having the maximum tangential angle a smaller than the tangential angle b (=56°), samples (T, V, W) having portions with the tangential angle b or larger contained to as much as exceeding 30%, and a sample (R) having portions with the tangential angle b only to as much as less than 10%, excluding 2 samples.

As shown in FIG. 16 and FIG. 17, it was confirmed that the non-uniformity in luminance was suppressed, when the portions with the tangential angle b (=56°) were contained to as much as 10% to 30% of all tangential angles $\psi$, and the ratio of maximum values and the minimum values of the luminance level in the front luminance distribution of light before being transmitted through the diffuser plate consequently became 0.7 or larger. As a consequence, the non-uniformity in luminance may be suppressed, by forming the luminance distribution generating layer 18 of the optical element 15 so as to contain the portions with the tangential angle b or larger to as much as 10% to 30% of the tangential angles $\psi$.

Figure 18:
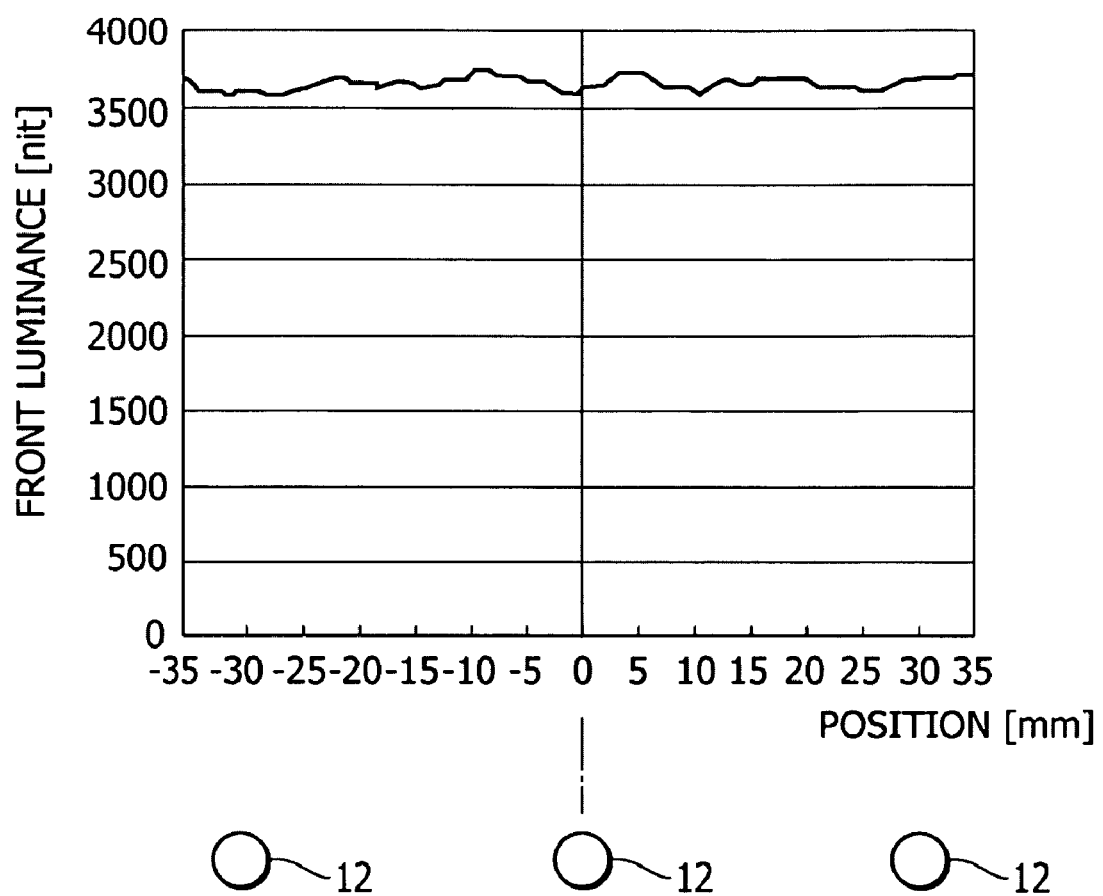
FIG. 18 is a graph showing a front luminance distribution observed in a state where light emitted from a plurality of light sources is transmitted through the optical element.

FIG. 18 is a graph showing a front luminance distribution observed in a state where light is emitted from the light sources transmitted through the optical element 15 and luminance distribution generating layer 18. As shown in FIG. 18, when the split image 12A of the light source 12 is positioned straightly above the adjacent light source 12 (see FIG. 12), uniformity in the front luminance distribution may be ensured even if the diffuser plate 14 is not provided. It is necessary herein, particularly for the case where L/W has large values, to form the luminance distribution generating layer 18 with large tangential angles $\psi$, for example with a tangential angle b of 56° or larger, in a highly precise manner.

However, as described in the above, by providing the diffuser plate 14 capable of diffusing light transmitted through the optical element 15, the split image 12A may be positioned straightly above the adjacent light source 12 by virtue of the action of the diffuser plate 14, in the state of light after being transmitted through the diffuser plate, even if the split image 12A of the light source 12 does not position straightly above the adjacent light source 12 in the state of light before being transmitted through the diffuser plate 14. As a consequence, if the diffuser plate 14 is provided, it will be not so much necessary to form the luminance distribution generating layer 18 with large tangential angles ψ irrespective of magnitude of L/W, and thereby manufacturing of the optical element 15 may be facilitated.

For the case where the diffuser plate 14 is not provided, the outer surface of the structural portions 18a, 18a, . . . of the luminance distribution generating layer 18 of the optical element 15 may preferably be formed into curved profile, in order to consecutively overlap the split images 12a of the light source 12 with each other, whereas for the case where the diffuser plate 14 is provided, the travel range x of the split image 12A may be reduced, and a smooth luminance distribution may be formed by virtue of effects of the diffuser plate 14 even under discontinuous split images 12A, so that the outer surface of the structural portions 18a, 18a, . . . may now be formed into a polygonal profile, or as having flat surface in part of the outer surface thereof, for example, and thereby manufacturing of the optical element 15 may be facilitated.

Figure 19:
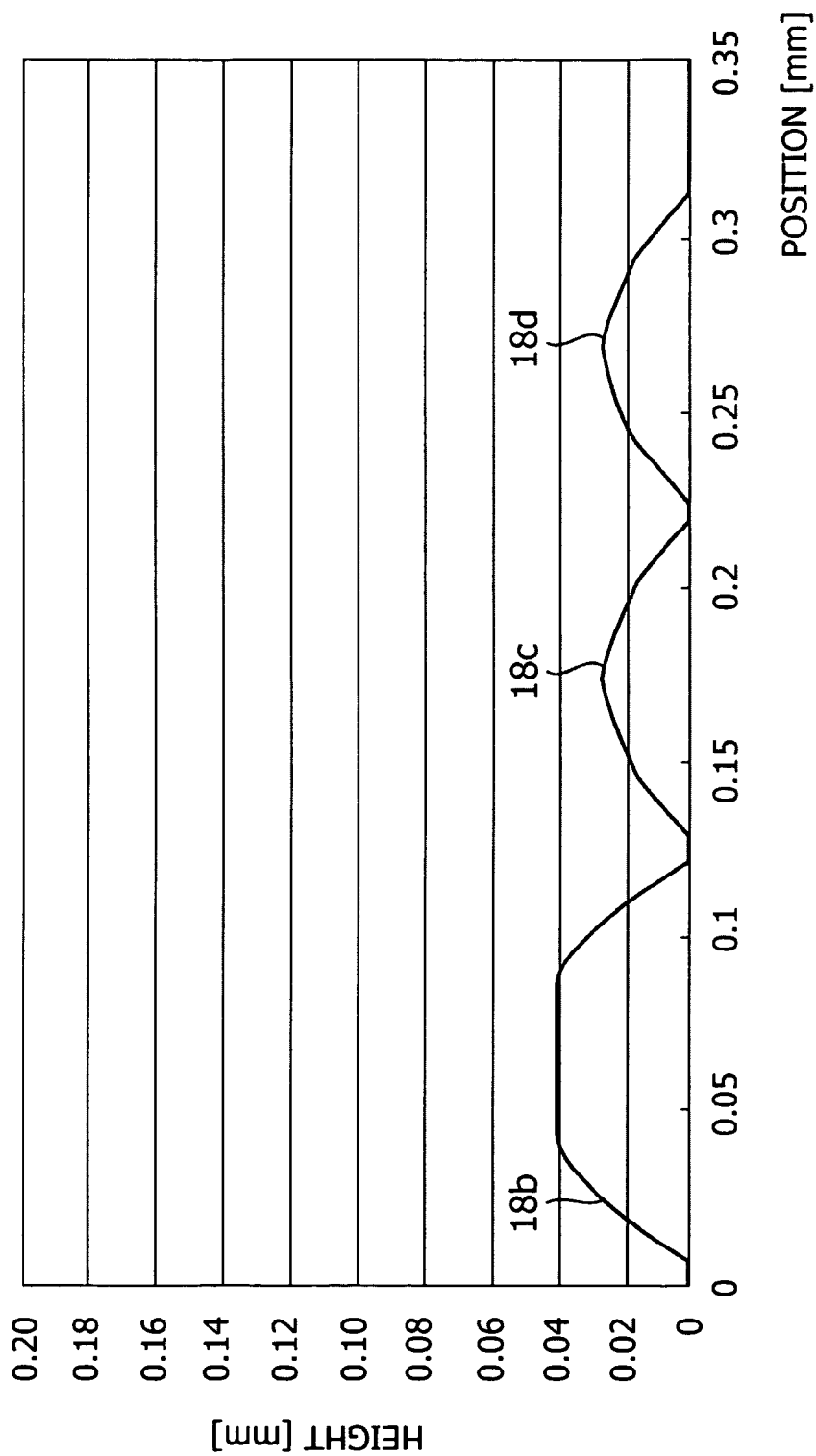
FIG. 19 is a conceptual drawing showing an example of the structural portion of the luminance distribution generating layer.

FIG. 19 shows an exemplary optical element 15 having structural portions 18a, 18a . . . formed into a flat plane at least in part thereof, when the diffuser plate 14 is provided.

FIG. 19 shows an exemplary case where a structural component is composed of a set of three structural portions 18b, 18c, 18d, and a large number of such structural components are consecutively formed.

In the example shown in FIG. 19, given with L/W=2.0, the luminance distribution generating layer 18 contains the portions with a tangential angle b of 56° or larger to as much as 10% to 15%, the luminance distribution generating layer 18 contains the portions with a tangential angle of 0°, that is, the portions formed into a flat plane normal to the optical axis, to as much as 10% to 20%, and the structural portion 18c and the structural portion 18d are formed into polygonal profiles.

Figure 20:
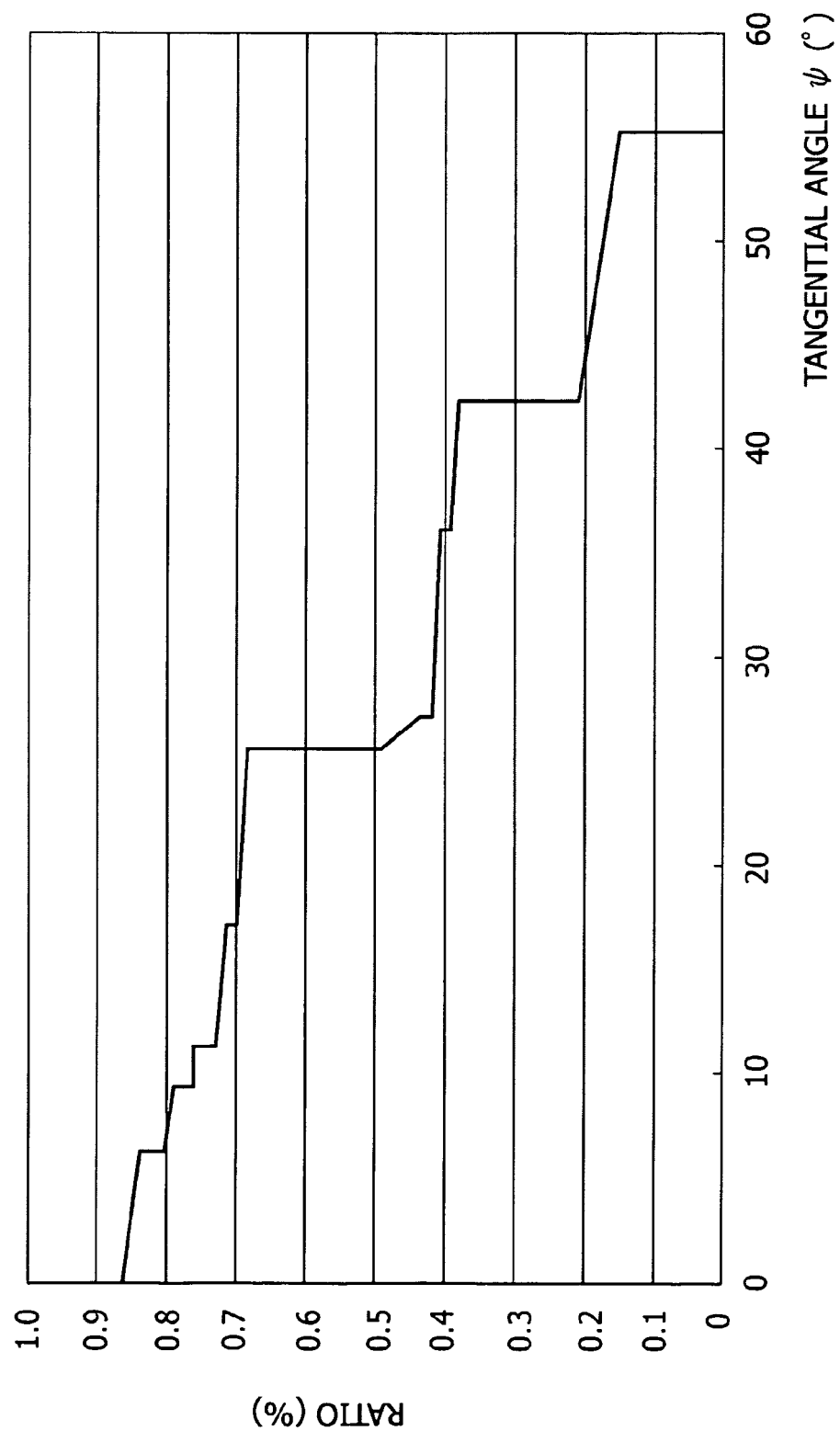
FIG. 20 is a graph showing tangential angle and its ratio, for the luminance distribution generating layer shown in FIG. 19.

FIG. 20 is a graph plotting on the ordinate the tangential angle ψ, and plotting on the abscissa the ratio of content of such tangential angle ψ in the luminance distribution generating layer 18, obtained for the optical element 15 shown in FIG. 19. As shown in FIG. 20, the optical element 15 shown in FIG. 19 contains the portions with a tangential angle of approximately 56° in the luminance distribution generating layer 18 to as much as 10% to 15%.

Figure 21:
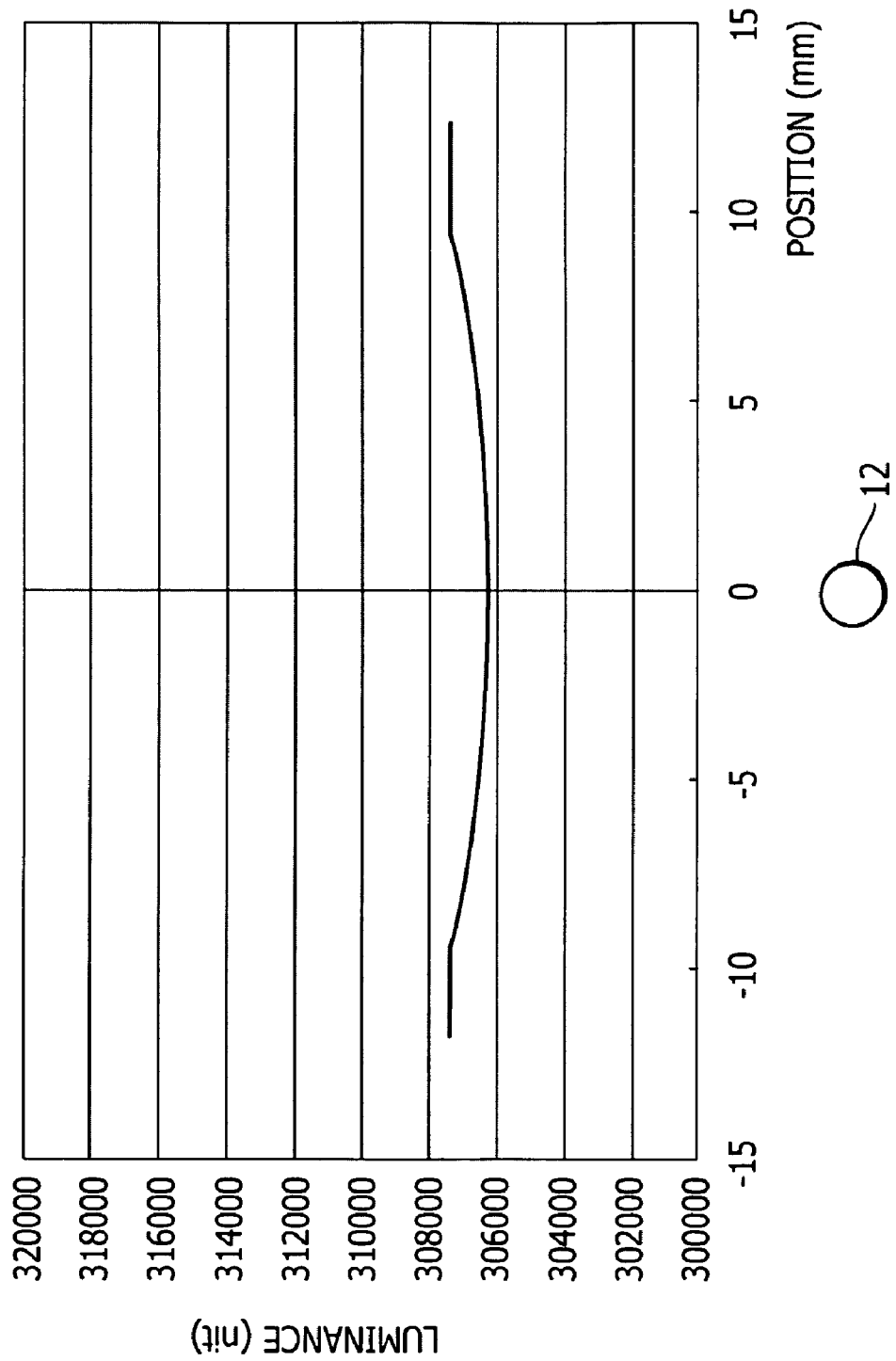
FIG. 21 is a graph showing a front luminance distribution in a state where light emitted from the light sources is transmitted through the diffuser plate, for the cases shown in FIG. 19 and FIG. 20.

FIG. 21 is a graph showing a front luminance distribution in a state where light emitted from the light sources 12, 12, . . . transmitted through the diffuser plate 14, for the cases shown in FIG. 19 and FIG. 20. Transmissivity of light of the diffuser plate 14 herein is 60%. As shown in FIG. 21, it was confirmed that the light was diffused by the diffusive action of the diffuser plate 14, a desirable level of uniformity in the front luminance distribution was ensured, and thereby the non-uniformity in luminance was suppressed.

Accordingly, the non-uniformity in luminance may be suppressed by using the diffuser plate 14, even when the outer surface of the structural portions 18a, 18a, . . . of the luminance distribution generating layer 18 of the optical element 15 was formed into a polygonal profile, or partially into a flat plane.

In the surface emission device 10, since the optical element component 16 such as diffusion sheet, prism sheet, or reflective polarizer, for example, is disposed as being opposed to the optical element 15 across the diffuser plate 14, the light diffused by the diffuser plate 14 may further be subjected to diffusion, scattering and so forth by the optical element component 16, and thereby the suppressive effect on the non-uniformity in luminance may be improved.

Next, an optical element package, which is a structure of integrating the optical element 15 and the diffuser plate 14, will be explained (see FIG. 22 and FIG. 23).

As described in the above, in the surface emission device 10, the optical element 15, the diffuser plate 14 and the optical element component 16 are sequentially disposed as viewed from the side of the light sources 12, 12, . . . , wherein warping, waving or the like because of its low rigidity may occur due to the thickness of these components, raising a cause for generating non-uniformity in luminance.

Figure 22:
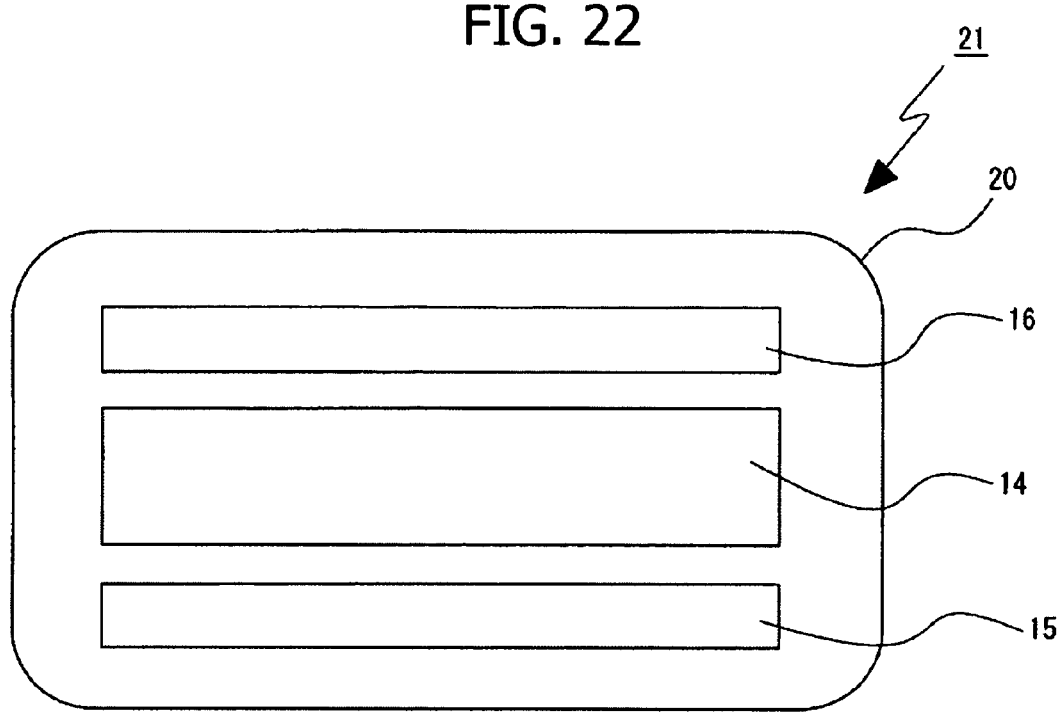
FIG. 22 is a conceptual drawing showing an optical element package having the optical element, the diffuser plate and an optical element component packaged by a packaging component.

In order to prevent such warping and waving from occurring, the optical element 15 and the diffuser plate 14, or the optical element 15 and the diffuser plate 14 and the optical element component 16 may be packaged using a packaging component 20 such as transparent sheet or transparent film, to thereby configure an optical element package 21 (see FIG. 22).

Figure 23:
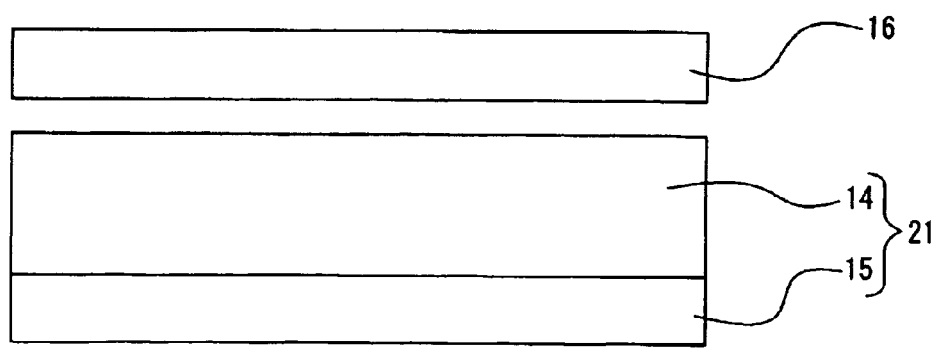
FIG. 23 is a conceptual drawing showing an optical element package having the optical element and the diffuser plate bonded to each other.

Alternatively, for example, the optical element 15 and the diffuser plate 14 may be bonded using a ultraviolet-curable resin or pressure-sensitive adhesive, to thereby configure an optical element package 22 (see FIG. 23). In this case, in addition to the optical element 15 and the diffuser plate 14, also the optical element component 16 may be bonded to the diffuser plate 14, to thereby configure the optical element package 22.

By configuring the optical element package 21 or the optical element package 22, the rigidity may be enhanced by increasing the thickness, and thereby avoiding the warping, waving and so forth.

Paragraphs below will show exemplary sectional profiles of the luminance distribution generating layer 18 of the optical element 15 (see FIG. 24 to FIG. 29).

Although the non-uniformity in luminance may be suppressed by forming the sectional profile (profile of the outer surface) of the luminance distribution generating layer 18 of the optical element 15 into a desired curved profile, it may often be difficult to form the luminance distribution generating layer 18 into the curved profile as described in the above. Formation of the luminance distribution generating layer 18 with polygonal profiles such as shown below, as approximation of the curved profile, will now successfully suppress the non-uniformity in luminance, while keeping the desirable workability.

Figure 24:
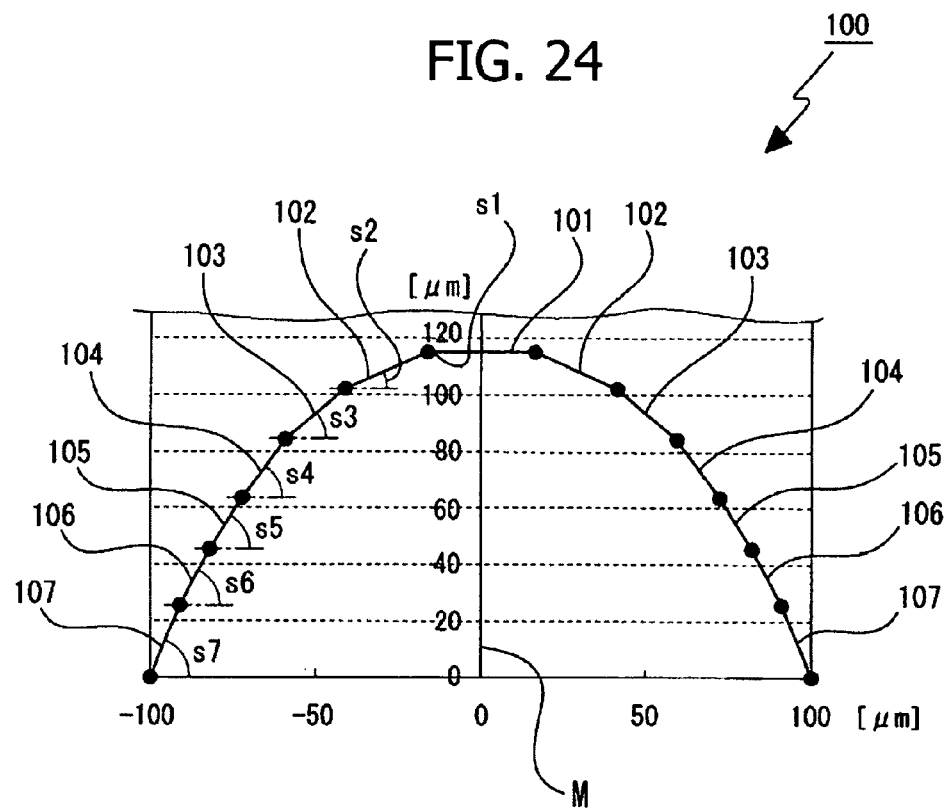
FIG. 24 is a drawing showing an exemplary luminance distribution generating layer having a polygonal profile.

FIG. 24 shows an example 100 of the luminance distribution generating layer 18 having such polygonal profile.

The luminance distribution generating layer 100 is configured by an outer surface 101 laid in parallel with the direction of arrangement of the light sources, and the outer surfaces 102, 102, 103, 103, . . . , 107, 107 gradually increased, referring to the outer surface 101, in the angle of inclination with respect to the direction of arrangement of the light sources towards the light sources. The luminance distribution generating layer 100 has a profile symmetrical in the direction of arrangement of the light sources about a center line M which falls on the point halving the outer surface 101. Assuming now angles of inclination of the individual outer surfaces 101, 102, 103, . . . in the direction of arrangement of the light sources sequentially as s1, s2, s3, . . . , s7, the luminance distribution generating layer 100 is formed so as to satisfy s1<s2<s3< . . . <s7.

Although the luminance distribution generating layer 100 herein is configured with 13 outer surfaces (line segments) differed in the angle, the number of outer surfaces is not limited to 13, instead, the number of outer surfaces may arbitrarily be determined while considering the distance L between the light sources, the diameter D of the light source and so forth.

By using the luminance distribution generating layer 18 having the sectional profile approximated to a curved profile as shown in FIG. 24, it is no more necessary to form such curved profile which may otherwise be difficult to form, and thereby ensuring a desirable workability of the optical element.

Figure 25:
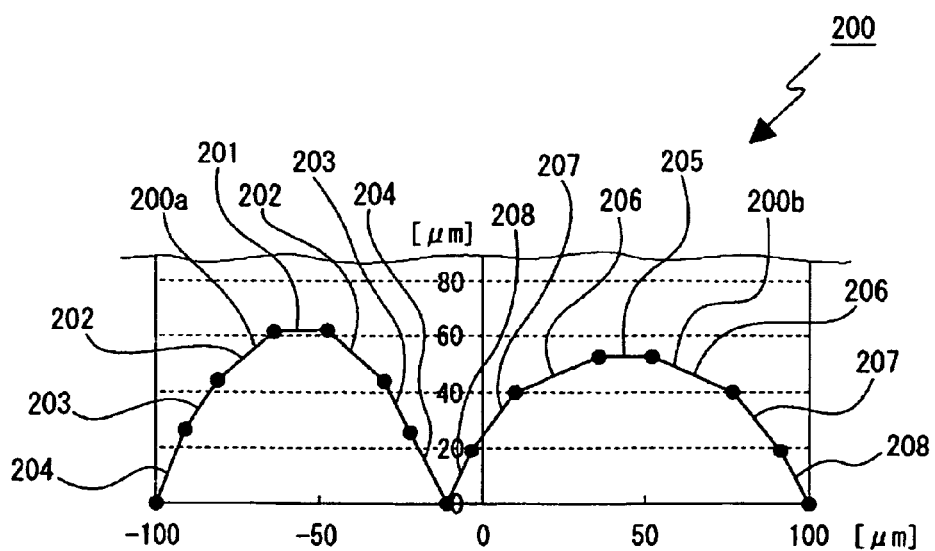
FIG. 25 is a drawing showing an exemplary luminance distribution generating layer having structural portions having two polygonal profiles.
Figure 26:
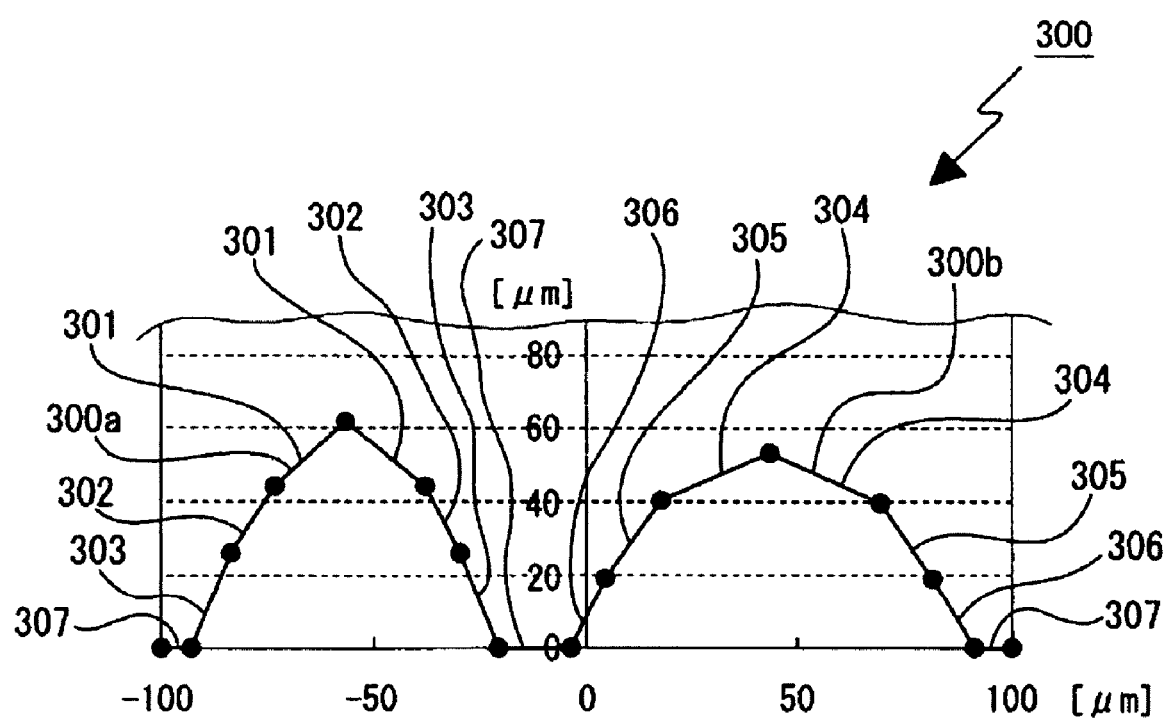
FIG. 26 is a drawing showing another exemplary luminance distribution generating layer having structural portions having two polygonal profiles.

FIG. 25 and FIG. 26 show examples 200, 300 of the luminance distribution generating layer, wherein the polygonal profile shown in FIG. 24 was divided to form a plurality of structural portions.

The luminance distribution generating layer 200 shown in FIG. 25 is configured with a plurality of sets of two structural portions 200a, 200b alternately arranged.

The structural portion 200a has seven outer surfaces, for example, and is composed of outer surfaces 201, 202, 202, 203, 203, 204, 204, whereas the structural portion 200b also has seven outer surfaces, for example, and is composed of outer surfaces 205, 206, 206, 207, 207, 208, 208.

The outer surfaces 201, 205 are laid in parallel with the direction of arrangement of the light sources, and respectively have an angle of inclination same as the angle of inclination s1 of the luminance distribution generating layer 100. The angles of inclination of the outer surfaces 202, 203, 204 with respect to the direction of arrangement of the light sources are respectively set equal to the angles of inclination s3, s5, s7 in the luminance distribution generating layer 100, and the angles of inclination of the outer surfaces 206, 207, 208 with respect to the direction of arrangement of the light sources are respectively set equal to the angles of inclination s2, s4, s6 in the luminance distribution generating layer 100.

By using such luminance distribution generating layer 200 composed of the structural portions 200a, 200b, 200a, 200b, . . . derived by division from the profile of the luminance distribution generating layer 100, the optical element may readily be processed, by virtue of smallness in the number of outer surfaces of the structural portions 200a, 200b.

The luminance distribution generating layer 300 shown in FIG. 26 is configured with a plurality of sets of two structural portions 300a, 300b alternately arranged.

The structural portion 300a has six outer surfaces, for example, and is composed of outer surfaces 301, 301, 302, 302, 303, 303, whereas the structural portion 300b also has six outer surfaces, for example, and is composed of outer surfaces 304, 304, 305, 305, 306, 306.

The angles of inclination of the outer surfaces 301, 302, 303 with respect to the direction of arrangement of the light sources are respectively set equal to the angles of inclination s3, s5, s7 in the luminance distribution generating layer 100, and the angles of inclination of the outer surfaces 304, 305, 306 with respect to the direction of arrangement of the light sources are respectively set equal to the angles of inclination s2, s4, s6 in the luminance distribution generating layer 100.

Between the structural portions 300a and 300b, there is formed a parallel plane 307 which is parallel with the direction of arrangement of the light sources. The parallel plane 307 is a plane corresponding to the outer surface 101 of the luminance distribution generating layer 100.

By using such luminance distribution generating layer 300 composed of the structural portions 300a, 300b, 300a, 300b, . . . derived by division from the profile of the luminance distribution generating layer 100, the optical element may readily be processed, by virtue of smallness in the number of outer surfaces of the structural portions 300a, 300b.

Figure 27:
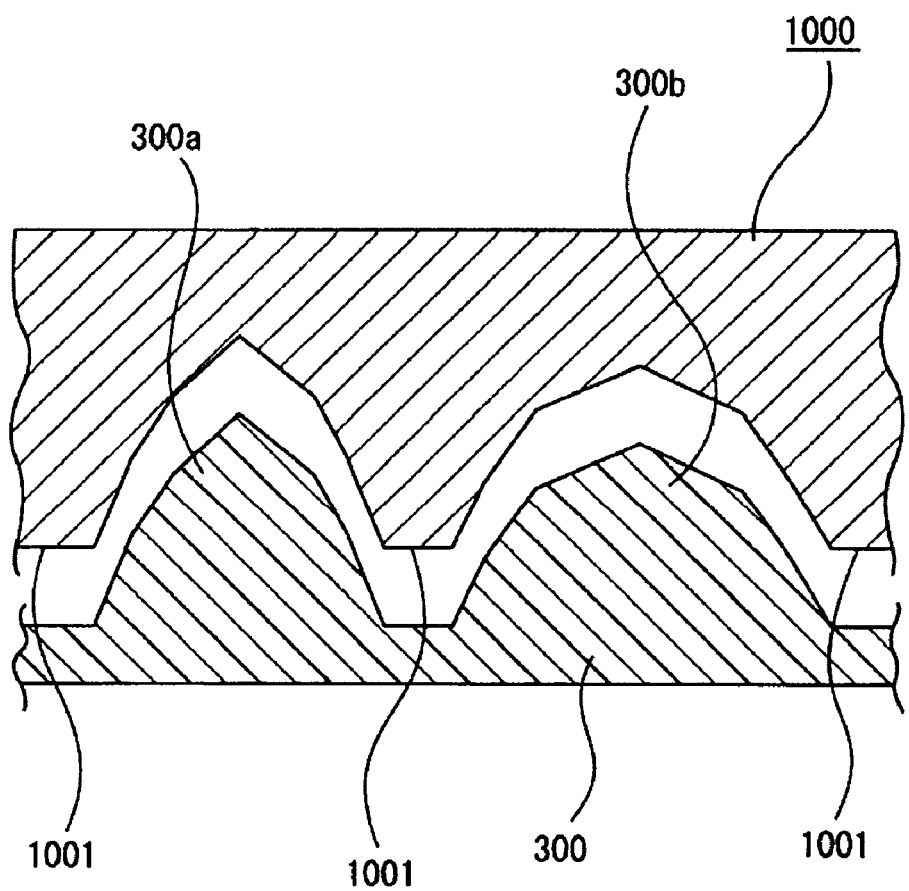
FIG. 27 is a drawing showing an optical element having the structural portion having two polygonal profiles, and a die for molding the optical element.

Furthermore, for the case of using the luminance distribution generating layer 300, when the optical element is formed by injection molding using a die 1000 such as shown in FIG. 27, the die 1000 will have a projection between the portions for forming the structural portion 300a and the structural portion 300b, so that the die is added with a large rigidity by virtue of the projection 1001 having a predetermined width in the direction of arrangement of the light sources. Accordingly, the projection 1001 may be less likely to deform, may allow smooth releasing of the die 1000, and may thereby improve accuracy of processing of the molded luminance distribution generating layer 300.

Figure 28:
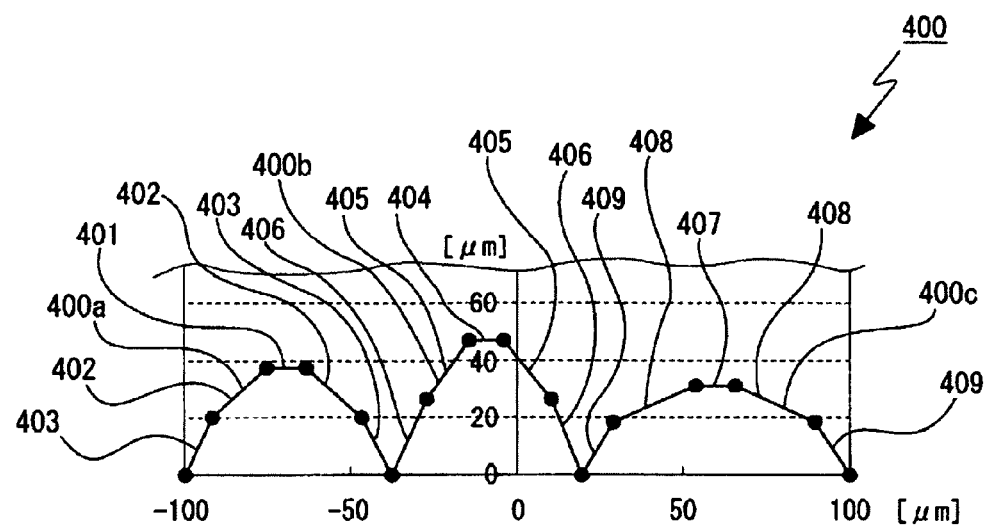
FIG. 28 is a drawing showing an exemplary luminance distribution generating layer having structural portions having three polygonal profiles.
Figure 29:
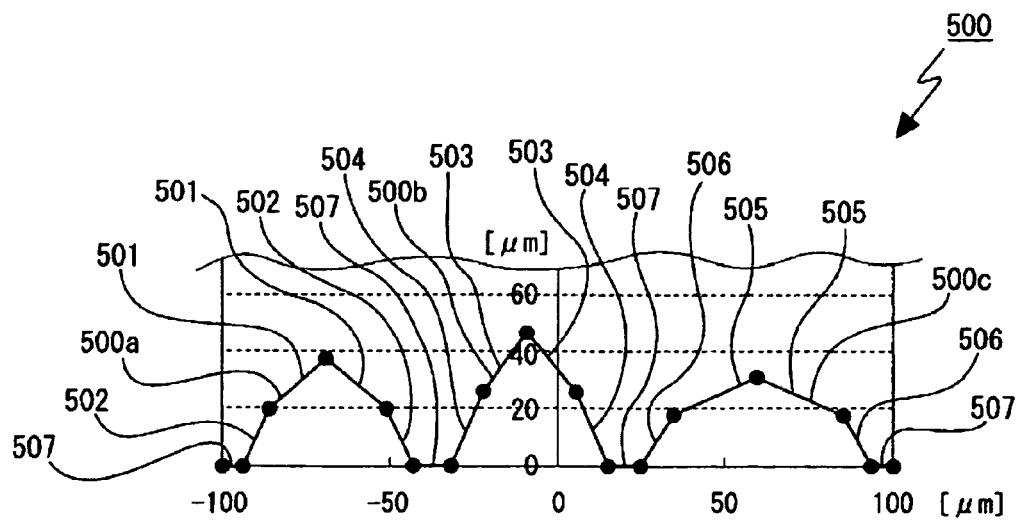
FIG. 29 is a drawing showing another exemplary luminance distribution generating layer having structural portions having three polygonal profiles.

FIG. 28 and FIG. 29 show examples 400, 500 of the luminance distribution generating layer, wherein the polygonal profile was divided into three.

The luminance distribution generating layer 400 shown in FIG. 28 is configured with a plurality of sets of three structural portions 400a, 400b, 400c alternately arranged.

The structural portions 400a, 400b, 400c respectively have five outer surfaces, for example, wherein the angles of inclination of the outer surfaces 401, 402, 403 of the structural portion 400a with respect to the direction of arrangement of the light sources are respectively set equal to the angles of inclination s1, s3, s6 in the luminance distribution generating layer 100, the angles of inclination of the outer surfaces 404, 405, 406 of the structural portion 400b with respect to the direction of arrangement of the light sources are respectively set equal to the angles of inclination s1, s4, s7 in the luminance distribution generating layer 100, and the angles of inclination of the outer surfaces 407, 408, 409 of the structural portion 400c with respect to the direction of arrangement of the light sources are respectively set equal to the angles of inclination s1, s2, s5 in the luminance distribution generating layer 100.

By using such luminance distribution generating layer 400 composed of the structural portions 400a, 400b, 400c, derived by division from the profile of the luminance distribution generating layer 100, the optical element may readily be processed, by virtue of smallness in the number of outer surfaces of the structural portions 400a, 400b, 400c.

The luminance distribution generating layer 500 shown in FIG. 29 is configured with a plurality of sets of three structural portions 500a, 500b, 500c alternately arranged.

The structural portions 500a, 500b, 400c respectively have four outer surfaces, for example, wherein the angles of inclination of the outer surfaces 501, 502 of the structural portion 500a with respect to the direction of arrangement of the light sources are respectively set equal to the angles of inclination s3, s6 in the luminance distribution generating layer 100, the angles of inclination of the outer surfaces 503, 504 of the structural portion 500b with respect to the direction of arrangement of the light sources are respectively set equal to the angles of inclination s4, s7 in the luminance distribution generating layer 100, and the angles of inclination of the outer surfaces 505, 506 of the structural portion 500c with respect to the direction of arrangement of the light sources are respectively set equal to the angles of inclination s2, s5 in the luminance distribution generating layer 100.

Between the structural portions 500a, 500b, 500c, there are formed parallel planes 507, 507 which are parallel with the direction of arrangement of the light sources. The parallel planes 507, 507 are planes corresponding to the outer surface 101 of the luminance distribution generating layer 100.

By using such luminance distribution generating layer 500 composed of the structural portions 500a, 500b, 500c derived by division from the profile of the luminance distribution generating layer 100, the optical element may readily be processed, by virtue of smallness in the number of outer surfaces of the structural portions 500a, 500b, 500c.

Also for the case where the luminance distribution generating layer 500 is used, a die will have a highly rigid projection similarly to the case where the luminance distribution generating layer 300 was used, and thereby accuracy of processing of the molded luminance distribution generating layer 500 may be improved.

The descriptions in the above showed the exemplary luminance distribution generating layers having a plurality of sets of two or three structural portions sequentially arranged, wherein the number of division of the polygonal profile is not limited to two or three, but may be four or more. These structures may be understood as being obtained by dividing a polygonal profile into a plurality of structural portions, showing optical characteristics not so largely differ from those of the undivided luminance distribution generating layer 100, so that the structure may arbitrarily be selected considering the processability.

Figure 30:
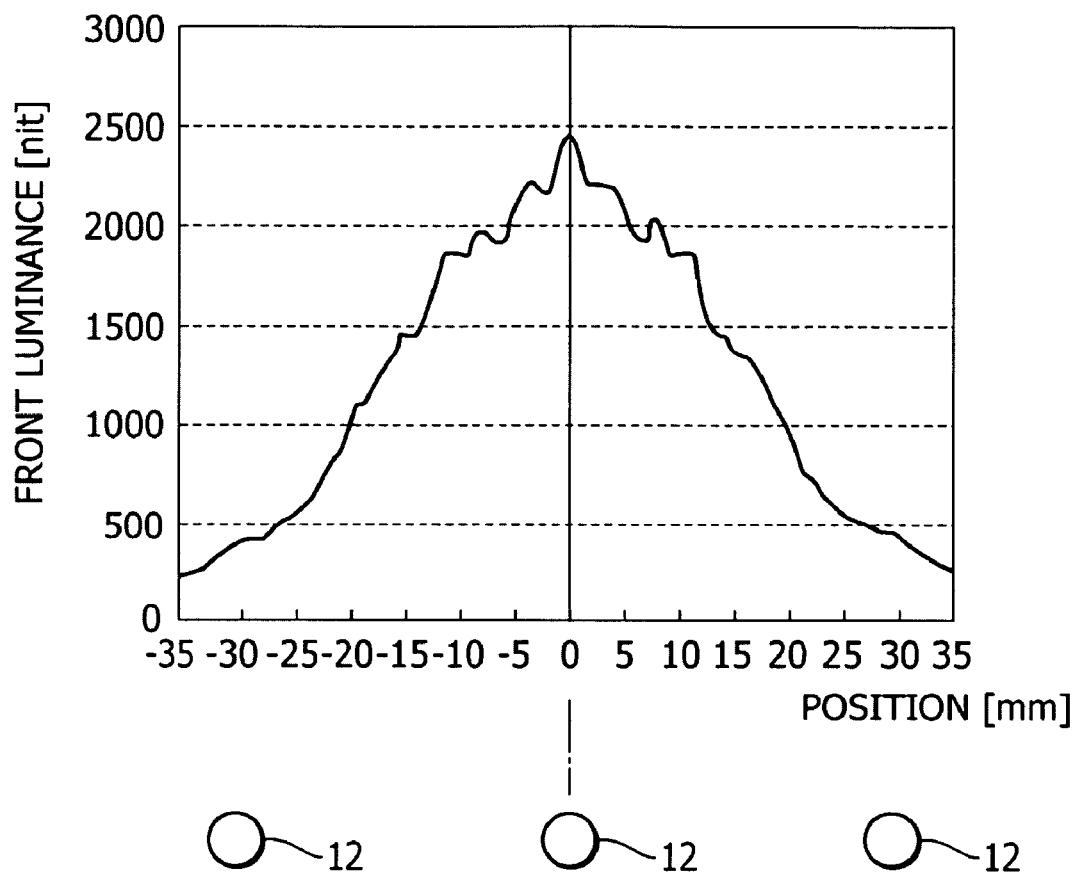
FIG. 30 is a drawing showing results of simulation of front luminance distribution observed when only one light source in the optical element having the luminance distribution generating layer shown in FIG. 26 is lit.

FIG. 30 is a graph showing exemplary results of simulation of front luminance distribution of the optical element having the luminance distribution generating layer 300, and corresponds to FIG. 4.

The front luminance distribution shows a mountain-like profile maximized in the luminance level at the position straightly above the light source 12, and sloped down towards the positions straightly above adjacent other light sources.

Figure 31:
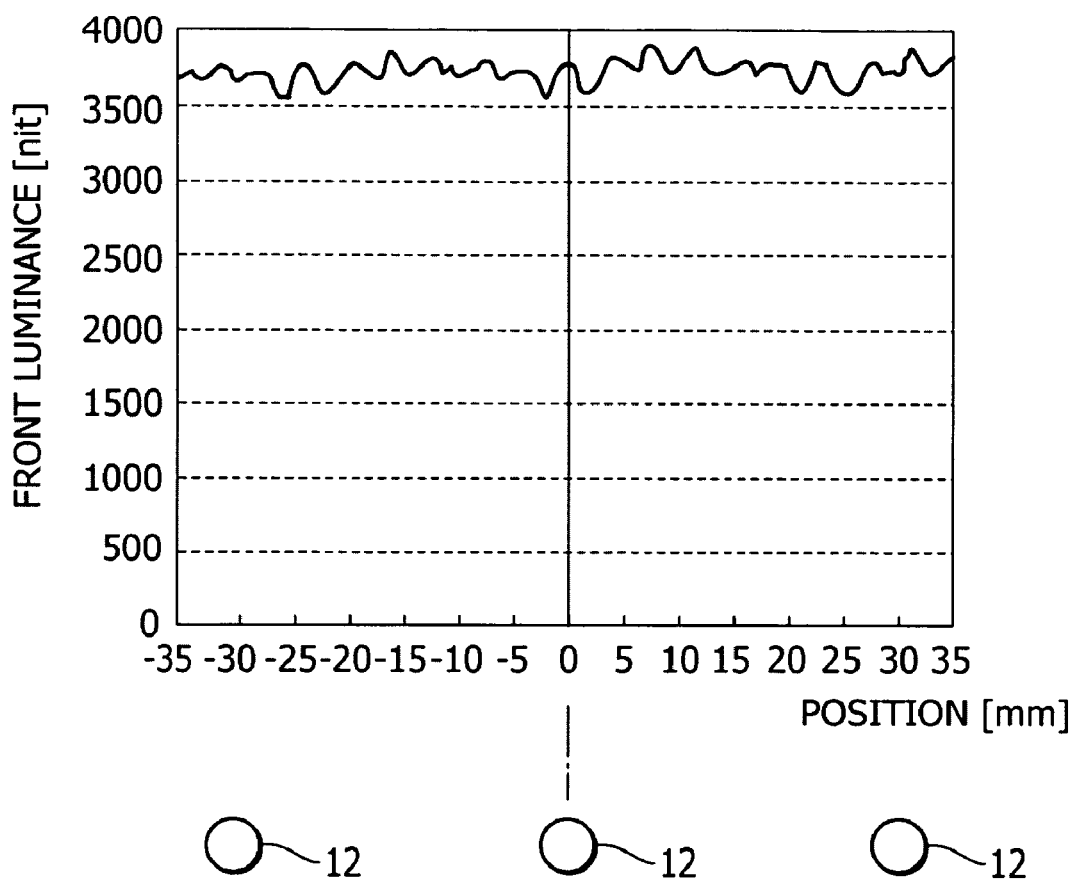
Figure 32:
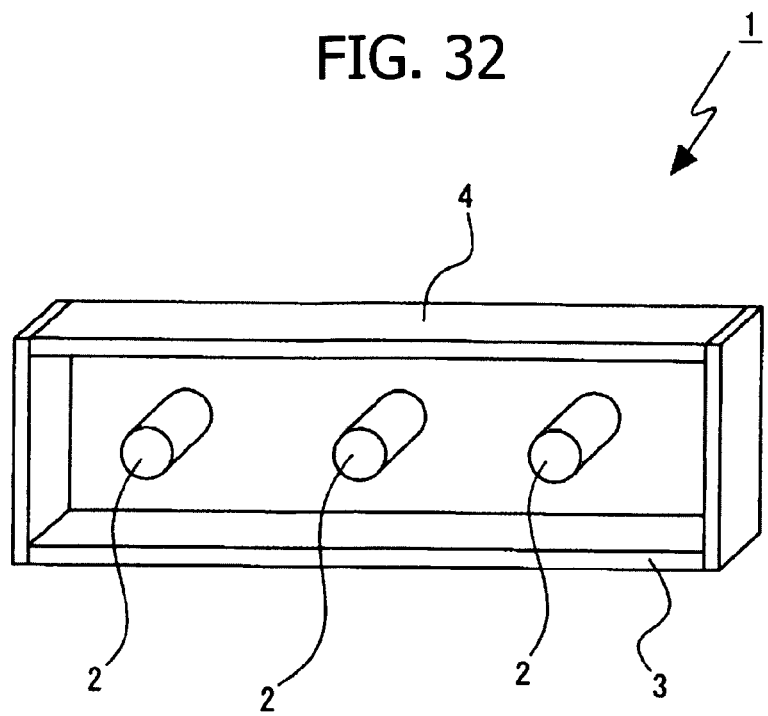
FIG. 32 is a schematic sectional view showing a conventional surface emission device.
Figure 33:
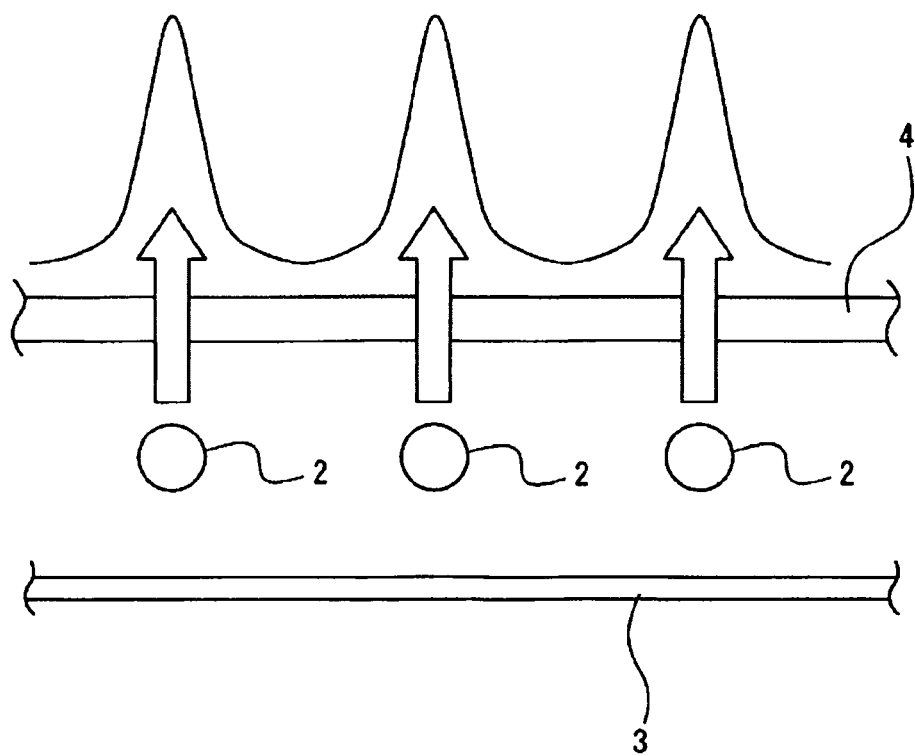
FIG. 33 is a conceptual drawing showing an exemplary front luminance distribution observed under shortened distance between the light source and the diffuser plate in a conventional surface emission device.
Figure 34:
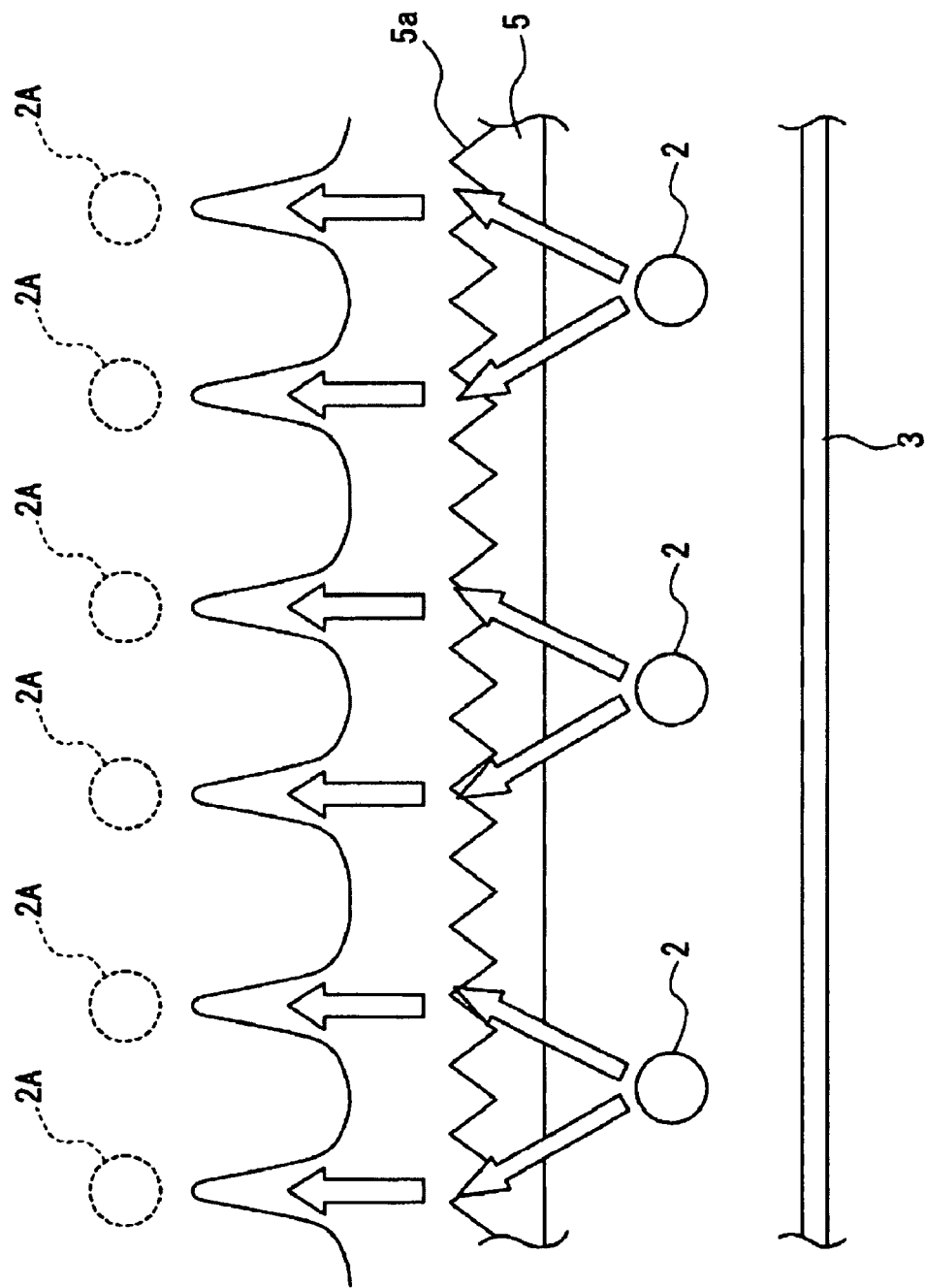
FIG. 34 is a conceptual drawing showing an exemplary front luminance distribution in a conventional surface emission device.

FIG. 31 is a graph showing a front luminance distribution observed when all light sources were turned on in FIG. 30, and corresponds to FIG. 18.

The results shown in FIG. 30 and FIG. 31 are found to contain slight non-uniformity in luminance as a whole, when compared with the results shown in FIG. 4 and FIG. 18, but the non-uniformity in luminance is different from non-uniformity in light sources depending on the distance L between the light sources, and may be suppressed to a non-problematic level in practice, by disposing a diffuser plate, diffuser sheet or the like.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A surface emission device comprising:
a plurality of light sources respectively shaped into a columnar form extending in a predetermined direction and disposed on the same plane as being extended in the same direction;
an optical element having transparency and having, as formed therein, a luminance distribution generating layer suppressing variation, in a direction of optical axes, in luminance of light emitted from the plurality of light sources; and
a reflective surface positioned as being opposed to the optical element across the plurality of light sources, while keeping an air layer between the optical element and itself, and reflecting light emitted from the light sources, wherein the luminance distribution generating layer of the optical element being composed of a plurality of structural portions extending in a longitudinal direction of the light sources and projecting in the direction of optical axes, the surface emission device characterized by:

having the optical element containing the maximum tangential angle a which satisfies x>L/2−D/2 and configured such that a component in an arrangement direction of the structural portions as viewed in a sectional profile thereof at an outer surface section in the sectional profile of a structural portion having a tangential angle Ψ that is larger than or equal to a tangential angle b of 56° has a percentage of 10% to 30% with respect to a component in the arrangement direction of the structural portions as viewed in the sectional profile thereof at an outer surface in the sectional profile of a structural portion included in the luminance distribution generating layer, when travel range x of a split image of the light sources in the direction normal to the optical axes is calculated using conditional equation (1) to conditional equation (3) below:

$$n_0 \sin(a) = n \sin(a - \theta_2) \quad (1)$$

$$n_0 \sin \theta_1 = n \sin \theta_2 \quad (2)$$

$$x = W \tan \theta_1 + d \tan \theta_2 \quad (3), \text{assuming:}$$

distance between centers of every adjacent light sources as L;
refractive index of the optical element as n;
thickness of the optical element as d;
distance from the center of the light sources to the optical element in the direction of optical axes as W;
refractive index of air in the air layer as $n_0$;
angle of incidence of light emitted from the light sources and coming into the optical element, relative to the direction of optical axes, as $\theta_1$;
angle of refraction of light, incident on the optical element, in the optical element as $\theta_2$;
diameter of each light source as D;
angles formed between a tangential line in contact with an outer surface of the luminance distribution generating layer and a plane orthogonal to the optical axes, as viewed in the sectional profile orthogonal to the longitudinal direction of the structural portions of the luminance distribution generating layer, as tangential angles Ψ;
a tangential angle largest of all tangential angles Ψ as a maximum tangential angle a;
a tangential angle, out of all the tangential angles Ψ, under which the split image of the light source reaches L/2 as b; and
L/W is 1.9 to 3.5.

2. The surface emission device as claimed in claim 1, characterized in that the plurality of structural portions included in the luminance distribution generating layer have the same size and shape.

3. The surface emission device as claimed in claim 1, characterized by having the optical element containing maximum tangential angle "a" which satisfies x=L−D/2.

4. The surface emission device as claimed in claim 1, characterized in that a diffuser plate is disposed as being opposed to the light sources across the optical element.

5. The surface emission device as claimed in claim 1, characterized in that:
a diffuser plate is disposed as being opposed to the light sources across the optical element, and
an optical element package formed by packaging the diffuser plate and the optical element with a packaging component is provided.

6. The surface emission device as claimed in claim 5, characterized in that at least one additional optical element besides the above-described optical element is provided within the optical element package.

7. The surface emission device as claimed in claim 1, characterized in that:
   a diffuser plate is disposed as being opposed to the light sources across the optical element, and
   an optical element package composed by bonding the diffuser plate and the optical element is provided.

8. The surface emission device as claimed in claim 1, characterized in that an outer surface of the individual structural portions of the luminance distribution generating layer is shaped into a curved profile.

9. The surface emission device as claimed in claim 1, characterized in that an outer surface of the individual structural portions of the luminance distribution generating layer is shaped into a polygonal profile.

10. The surface emission device as claimed in claim 9, characterized in that the individual structural portions are shaped into a form symmetrical about the line in the direction of arrangement of the light sources, and shaped so that the angle of inclination of the individual outer surfaces thereof with respect to the direction of arrangement of the light sources gradually increases as being closer to the light sources.

11. The surface emission device as claimed in claim 10, characterized in that a flat plane orthogonal to the optical axis is formed between every adjacent structural portions.

12. The surface emission device as claimed in claim 1, characterized in that a base material and the luminance distribution generating layer are integrated.

13. The surface emission device as claimed in claim 1, characterized in that:
   a base material and the luminance distribution generating layer are composed of different materials, and the luminance distribution generating layer is bonded to the base material.

14. The surface emission device as claimed in claim 13, characterized in that:
   the base material is composed of polyethylene terephthalate, and
   the luminance distribution generating layer is composed of ultraviolet curable resin.

15. An optical element comprising:
   a luminance distribution generating layer suppressing variation, in a direction of optical axes, in luminance of light emitted from a plurality of light sources respectively shaped into a columnar form extending in a predetermined direction and disposed on the same plane as being extended in the same direction, in which the luminance distribution generating layer is composed of a plurality of structural portions extending in a longitudinal direction of the light sources and projecting in the direction of optical axes, the optical element characterized by being configured so as to contain a maximum tangential angle a which satisfies x>L/2−D/2 and configured such that a component in an arrangement direction of the structural portions as viewed in a sectional profile thereof at an outer surface section in the sectional profile of a structural portion having a tangential angle $\Psi$ that is larger than or equal to a tangential angle b of 56° has a percentage of 10% to 30% with respect to a component in the arrangement direction of the structural portions as viewed in the sectional profile thereof at an outer surface in the sectional profile of a structural portion included in the luminance distribution generating layer, when travel range x of a split image of the light sources in a direction normal to the optical axes is calculated using conditional equation (1) to conditional equation (3) below:

$$n_0 \sin(a) = n \sin(a - \theta_2) \quad (1)$$

$$n_0 \sin \theta_1 = n \sin \theta_2 \quad (2)$$

$$x = W \tan \theta_1 + d \tan \theta_2 \quad (3), \text{assuming:}$$

distance between the centers of every adjacent light sources as L;
   refractive index of the optical element as n;
   thickness of the optical element as d;
   distance from the center of the light sources to the optical element in the direction of optical axes as W;
   refractive index of air in the air layer as $n_0$;
   angle of incidence of light emitted from the light sources and coming into the optical element, relative to the direction of optical axes, as $\theta_1$;
   angle of refraction of light, incident on the optical element, in the optical element as $\theta_2$;
   diameter of each light source as D;
   angles formed between a tangential line in contact with an outer surface of the luminance distribution generating layer and a plane orthogonal to the optical axes, as viewed in the sectional profile orthogonal to a longitudinal direction of the structural portions of the luminance distribution generating layer, as tangential angles $\Psi$;
   a tangential angle largest of all tangential angles $\Psi$ as the maximum tangential angle a;
   a tangential angle, out of all the tangential angles $\Psi$, under which the split image of the light source reaches L/2 as b; and
   L/W is 1.9 to 3.5.

16. The optical element as claimed in claim 15, characterized in that the plurality of structural portions included in the luminance distribution generating layer have the same size and shape.

17. The optical element as claimed in claim 15, characterized in that a base material and the luminance distribution generating layer are integrated.

18. The optical element as claimed in claim 15, characterized in that:
   a base material and the luminance distribution generating layer are composed of different materials, and the luminance distribution generating layer is bonded to the base material.

19. The optical element as claimed in claim 18, characterized in that:
   the base material is composed of polyethylene terephthalate, and
   the luminance distribution generating layer is composed of ultraviolet curable resin.

20. A liquid crystal display device comprising:
   a plurality of light sources respectively shaped into a columnar form extending in a predetermined direction and disposed on the same plane as being extended in the same direction;
   an optical element having transparency and having, as formed therein, a luminance distribution generating layer suppressing variation, in a direction of optical axes, in luminance of light emitted from the plurality of light sources, the luminance distribution generating layer being composed of a plurality of structural portions extending in a longitudinal direction of the light sources and projecting in the direction of optical axes;

a reflective surface positioned as being opposed to the optical element across the plurality of light sources, while keeping an air layer between the optical element and itself, and reflecting light emitted from the light sources; and a liquid crystal panel allowing thereon image display and irradiated with light emitted from the plurality of light sources, the liquid crystal display device characterized by having the optical element containing a maximum tangential angle "a" which satisfies x>L/2−D/2 and configured such that a component in an arrangement direction of the structural portions as viewed in a sectional profile thereof at an outer surface section in the sectional profile of a structural portion having a tangential angle $\Psi$ that is larger than or equal to a tangential angle b of 56° has a percentage of 10% to 30% with respect to a component in the arrangement direction of the structural portions as viewed in the sectional profile thereof at an outer surface in the sectional profile of a structural portion included in the luminance distribution generating layer, when travel range x of a split image of the light sources in a direction normal to the optical axes is calculated using conditional equation (1) to conditional equation (3) below:

$$n_0 \sin(a) = n \sin(a-\theta_2) \quad (1)$$

$$n_0 \sin \theta_1 = n \sin \theta_2 \quad (2)$$

$$x = W \tan \theta_1 + d \tan \theta_2 \quad (3), \text{assuming:}$$

distance between centers of every adjacent light sources as L;

refractive index of the optical element as n;

thickness of the optical element as d;

distance from the center of the light sources to the optical element in the direction of optical axes as W;

refractive index of air in the air layer as $n_0$;

angle of incidence of light emitted from the light sources and coming into the optical element, relative to the direction of optical axes, as $\theta_1$;

angle of refraction of light, incident on the optical element, in the optical element as $\theta_2$;

diameter of each light source as D;

angles formed between a tangential line in contact with an outer surface of the luminance distribution generating layer and a plane orthogonal to the optical axes, as viewed in the sectional profile orthogonal to the longitudinal direction of the structural portions of the luminance distribution generating layer, as tangential angles $\Psi$;

a tangential angle largest of all tangential angles $\Psi$ as the maximum tangential angle a;

a tangential angle, out of all the tangential angles $\Psi$, under which the split image of the light source reaches L/2 as b; and L/W is 1.9 to 3.5.

* * * * *